US011465738B2

(12) United States Patent
Karem et al.

(10) Patent No.: US 11,465,738 B2
(45) Date of Patent: Oct. 11, 2022

(54) FAIL-OPERATIONAL VTOL AIRCRAFT

(71) Applicant: Overair, Inc., Lake Forest, CA (US)

(72) Inventors: Abraham Karem, Santa Ana, CA (US); Ryan Doss, Irvine, CA (US); William Martin Waide, Central Point, OR (US); Benjamin Tigner, Laguna Beach, CA (US)

(73) Assignee: Overair, Inc., Santa Ana, CA (US)

( * ) Notice: Subject to any disclaimer, the term of this patent is extended or adjusted under 35 U.S.C. 154(b) by 281 days.

(21) Appl. No.: 16/869,188

(22) Filed: May 7, 2020

(65) Prior Publication Data

US 2021/0229802 A1 Jul. 29, 2021

Related U.S. Application Data

(60) Provisional application No. 62/981,738, filed on Feb. 26, 2020, provisional application No. 62/966,908, filed on Jan. 28, 2020.

(51) Int. Cl.
| | |
|---|---|
| *B64C 27/68* | (2006.01) |
| *B64C 29/00* | (2006.01) |
| *B64C 3/38* | (2006.01) |
| *B64D 27/02* | (2006.01) |
| *B64D 27/24* | (2006.01) |
| *B64C 27/10* | (2006.01) |
| *B64C 27/72* | (2006.01) |

(52) U.S. Cl.
CPC ............... *B64C 27/68* (2013.01); *B64C 3/38* (2013.01); *B64C 27/10* (2013.01); *B64C 27/72* (2013.01); *B64C 29/0033* (2013.01); *B64D 27/02* (2013.01); *B64D 27/24* (2013.01); *B64C 2027/7205* (2013.01)

(58) Field of Classification Search
CPC ......... B64C 3/385; B64C 27/10; B64C 27/28; B64C 27/52; B64C 29/0033; B64C 29/0075
See application file for complete search history.

(56) References Cited

U.S. PATENT DOCUMENTS

| | | | | |
|---|---|---|---|---|
| 3,035,789 A | * | 5/1962 | Young | B64C 29/0033 244/7 C |
| 5,381,985 A | * | 1/1995 | Wechsler | B64C 11/48 244/69 |

(Continued)

FOREIGN PATENT DOCUMENTS

| | | |
|---|---|---|
| JP | 2000344197 A | 12/2000 |
| KR | 1020180083183 | 7/2018 |
| WO | 2019232535 A1 | 12/2019 |

*Primary Examiner* — Philip J Bonzell
*Assistant Examiner* — Michael B. Kreiner
(74) *Attorney, Agent, or Firm* — Fish IP Law, LLP

(57) ABSTRACT

An aircraft capable of carrying at least 400 pounds of payload, has four rotors systems, each of the rotor systems being independently driven by an electric motor or other torque-producing source. Each of the rotor systems provide sufficient thrust such that the aircraft is capable of controlled vertical takeoff and landing, even if one of the variable pitch rotor is inoperable. An electronic control system is configured to control the rotational speed and pitch of at least one of the rotor systems in each of the first and second rotor pairs. The rotors may be arranged in coaxial stacks or maybe otherwise configured.

15 Claims, 27 Drawing Sheets

(56) References Cited

U.S. PATENT DOCUMENTS

| | | | |
|---|---|---|---|
| 5,499,785 A * | 3/1996 | Roberts | B64D 1/12 |
| | | | 244/3 |
| 6,641,365 B2 * | 11/2003 | Karem | B64C 27/467 |
| | | | 416/131 |
| 7,210,651 B2 | 5/2007 | Scott | |
| 7,648,338 B1 | 1/2010 | Welsh | |
| 8,366,049 B2 * | 2/2013 | Karem | B64D 1/08 |
| | | | 244/137.1 |
| 8,496,434 B2 * | 7/2013 | Brunken, Jr. | B64C 27/10 |
| | | | 416/114 |
| 8,500,062 B2 * | 8/2013 | Brunken, Jr. | B64C 29/0033 |
| | | | 244/17.11 |
| 8,640,983 B2 * | 2/2014 | Brunken, Jr. | B64C 29/0033 |
| | | | 416/114 |
| 8,640,985 B2 * | 2/2014 | Brunken, Jr. | B64C 27/10 |
| | | | 244/6 |
| 9,102,401 B2 * | 8/2015 | Collins | B64C 29/0033 |
| 9,452,667 B2 * | 9/2016 | Harmon | B60J 11/06 |
| 9,604,729 B2 * | 3/2017 | Henze | B64C 11/306 |
| 10,266,252 B2 * | 4/2019 | Anderson | B64C 29/0033 |
| 10,279,892 B2 * | 5/2019 | Bosworth | B64C 3/385 |
| 10,351,235 B2 * | 7/2019 | Karem | B64C 13/18 |
| 2006/0016930 A1 | 1/2006 | Pak | |
| 2016/0114887 A1 | 4/2016 | Zhou et al. | |
| 2018/0002011 A1 | 1/2018 | McCullough et al. | |
| 2018/0208305 A1 | 7/2018 | Lloyd et al. | |
| 2018/0334251 A1 * | 11/2018 | Karem | B64C 3/16 |
| 2019/0135413 A1 | 5/2019 | Moore et al. | |
| 2019/0248486 A1 | 8/2019 | Chen et al. | |
| 2019/0291862 A1 | 9/2019 | Lyasoff et al. | |
| 2019/0329882 A1 | 10/2019 | Baity et al. | |
| 2020/0010187 A1 | 1/2020 | Bevirt et al. | |
| 2020/0239127 A1 * | 7/2020 | Karem | B64C 9/20 |

* cited by examiner

FAIL-OPERATIONAL VTOL AIRCRAFT

This application claims the benefit of priority to U.S. provisional application having Ser. No. 62/981,738 filed on Feb. 26, 2020. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is vertical takeoff and landing (VTOL) aircraft.

BACKGROUND

VTOL aircraft have long been desired for their ability to take off and land from small geometric footprints, which increases the flexibility of the aircraft's operations as the vehicle is able to bring passengers and payload closer to the desired destination, and does not require the same infrastructure investment or land area needed by a conventional takeoff and landing (CTOL) aircraft.

However, VTOL aircraft have several disadvantages relative to CTOL aircraft. First, a VTOL aircraft will require significantly more installed power (given by the rated power of the installed engines, drive motors, batteries, and drivetrain) than a CTOL aircraft because it takes significantly more power for a VTOL aircraft to hover than for a CTOL aircraft to take off via runway. The increased installed power drives the aircraft to a higher weight and cost, limiting the usefulness of the vehicle. For some powertrain configurations, such as battery-only power sources, a feasible design may not be possible for certain VTOL configurations using present-day component technology due to limits in battery and motor power density.

Second, VTOL aircraft are typically louder than CTOL aircraft of the same size, particularly during takeoff and landing. This also reduces the usefulness of VTOL aircraft as the acoustic signature can lead to public annoyance resulting in operational limitations placed on vehicle use.

Finally, VTOL safety records lag the rest of aviation. VTOL aircraft, and in particular helicopters, typically have one or more single points of failure in their rotor and powertrain systems. As a result, helicopters often recover from a propulsion system failure through an autorotation landing in which a high level of pilot skill is required in order to control a benign, but immediate landing; however, such a landing is problematic in the dense urban areas where VTOL aircraft provide the greatest operational advantage in terms of landing site flexibility.

A new class of VTOL aircraft, often electric-powered "eVTOL" aircraft, has emerged to address these shortcomings. US20180334251A1 (Karem), incorporated herein by reference, surveys the prior art. The prior art has many vehicles that use five or more rotors in VTOL flight, some of which are able to continue safe operation after a single rotor system failure. However, vehicles with more rotors will necessarily have smaller diameter rotors with a lower overall vehicle rotor disk area to fit in the same footprint, and therefore will have higher disk loading (weight divided by total rotor disk area). This will lead to increased noise and decreased aircraft power loading (thrust divided by power required) in vertical takeoff. Lower power loading will reduce the usefulness of the vehicle-lower power loading will increase the energy consumed by an aircraft and increase the required capacity of the powertrain. A large number of rotors also leads to either many exposed lift rotors in forward flight, which reduces lift to drag ratio and thus speed and range, or requires a large number of tilting rotors.

Karem addresses such power loading and noise issues by introducing vehicles with two to four flight-critical rotor systems; a four-rotor embodiment is shown in FIG. 1. Such vehicles tend to have lower disk loading within a given footprint (due to the larger possible rotor diameters) and thus gain power loading and noise advantages; however, these vehicles are less safe due to single points of failure in the rotor system. Vehicles such as Karem's attempt to increase safety through redundant motors, batteries, or engines, but will still have single points of failure in the gear reduction system and rotor control system.

Additional prior art attempts to address the hover power loading and noise disadvantages of VTOL aircraft via multiple co-rotating coaxial rotors; indeed, the noise and power loading advantages of coaxial rotors are known. As shown in FIG. 2, U.S. Pat. No. 8,640,985 discloses an aircraft with two rotor stacks, each stack having two rotor systems. The rotor systems in each stack are fixed relative to each other, and not independently rotatable, and driven around a common axis for increased aircraft level power loading and reduced noise. However, in each of the coaxial stacks, the rotors are unable to rotate independently of each other.

As shown in FIG. 3, US20190135413A1 discloses an aircraft with six stacks of two small, co-rotating propellers for noise reduction and increased power loading. The two propellers in each of the coaxial stacks can move relative to each other to adjust the azimuth angle for optimal noise and power loading characteristics. While this design includes independent rotation for real-time tailoring of azimuthal spacing between propeller, it does not appear to contemplate oversizing each rotor system to enable flight with one of the two rotors of a rotor stack inoperative. Moreover, a person of ordinary skill in the art would not think to oversize the rotors in the aircraft of FIG. 3. The relatively small diameter and greater number of rotors makes oversizing of thrust capacity in each rotor less advantageous, as the aircraft has a large number of backup propellers if one should fail.

FIG. 4 shows Airspace Experience Technology's MOBI-ONE, a tilt-wing aircraft with eight small rotors arranged in four co-rotating coaxial stacks of two rotors each. The coaxial stacks tilt with the wing. The vehicle features a ninth, aft auxiliary rotor for pitch control. While the total of four coaxial stacks and a fifth auxiliary rotor allows for continued flight with one coaxial stack inoperable, the increased number of rotor stacks necessarily forces the rotors to be smaller, leading to a higher disk loading and the resulting low power loading experienced by VTOL aircraft using several small rotors.

FIG. 5A and FIG. 5B show Embraer's PULSE concept, a tiltrotor aircraft with four rotors arranged in two tilting coaxial rotor stacks. Here, the coaxial design provides for reduced noise and increased power loading relative to two tilting single rotors, but the relatively small rotors are sized to fit inside of the closed wing, which results in lower power loading relative to aircraft with larger tilting rotors. The PULSE concept discloses a hover rotational speed of the rotors as approximately 850 RPM, which follows the conventional wisdom that a rotor should turn fast enough to avoid a gearbox. Conventional wisdom in urban aerial mobility also teaches that rotor tip speed should be below 450 feet per second in hover to control noise, which would result in a rotor of approximately 10 feet diameter. At this rotor size, it appears to the present applicant that disk loading will be high (likely 30 pounds per square foot or more), which would make a vehicle with a powertrain sized to provide all of the thrust required by the vehicle through only one of each rotor in a coaxial stack unlikely. Thus, it also appears that while an aircraft of the PULSE concept might be able to land safely in the event that one rotor on each side was rendered inoperable, the aircraft would not be able continue along a normal flight plan, including for example vertical takeoff.

FIG. 6 Shows a VTOL aircraft with four coaxial stacks of two rotors each for a total of eight rotors. In each coaxial stack, the rotors are counter-rotating allowing for torque control of the aircraft. However, this vehicle also uses a large number of small rotors in line with the prevailing wisdom. It may be that the aircraft is able to cut power to one rotor from each coaxial stack and descend benignly.

FIG. 7 shows the Joby six rotor VTOL. The prevailing wisdom would suggest the design has the nicety of reliability afforded by having many rotors dispersed about the aircraft. A person of ordinary skill would not think to reduce the number of Joby's rotors because the large number of rotors would require only a 150% propulsion system oversizing to accommodate a situation for the case in which a rotor system fails, and an opposite rotor system is also shut down to compensate torque and moment balance. Modifying a Joby type aircraft to have significantly fewer, but larger, rotors would also be against the prevailing wisdom because one of ordinary skill would think that doing so would preclude the presumed additional reliability afforded by many rotors. Such a VTOL aircraft is also against the prevailing wisdom of existing vehicles with two tilting rotors or coaxial rotor stacks, which rely on the vehicle having high enough reliability in a single point of failure rotor system to ensure safety.

DETAILED DESCRIPTION

Figure 1:
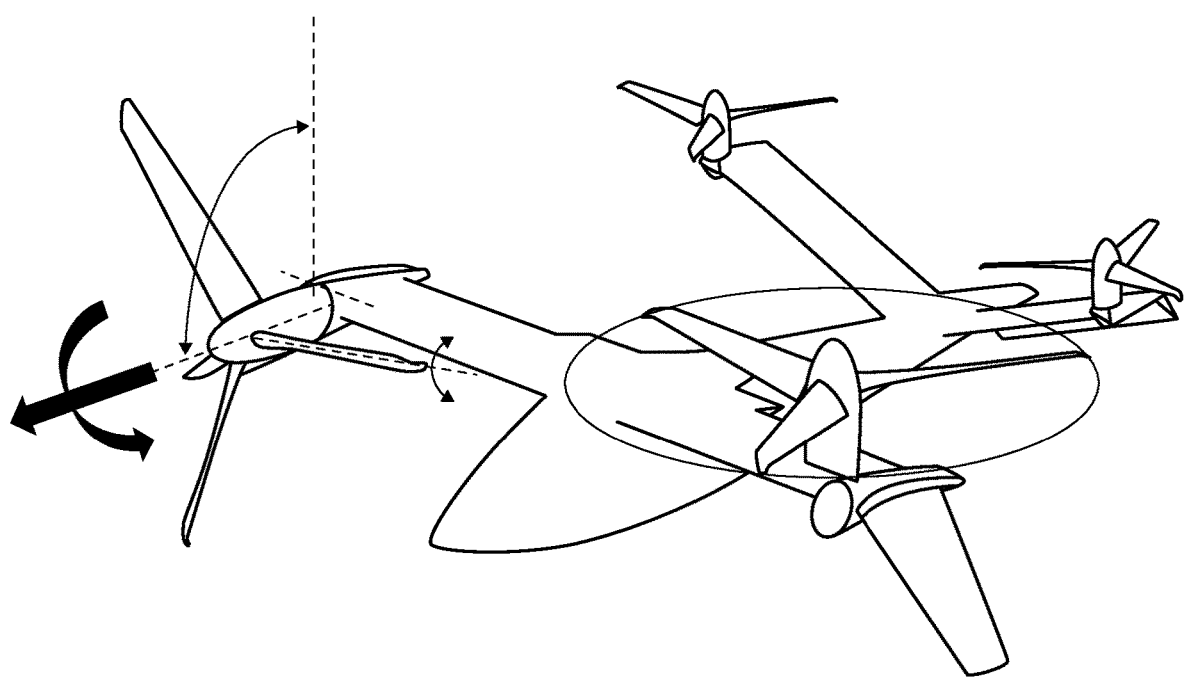
FIG. 1 is a drawing of a prior art four rotor embodiment of a vehicle with two to four flight-critical rotor systems.
Figure 2:
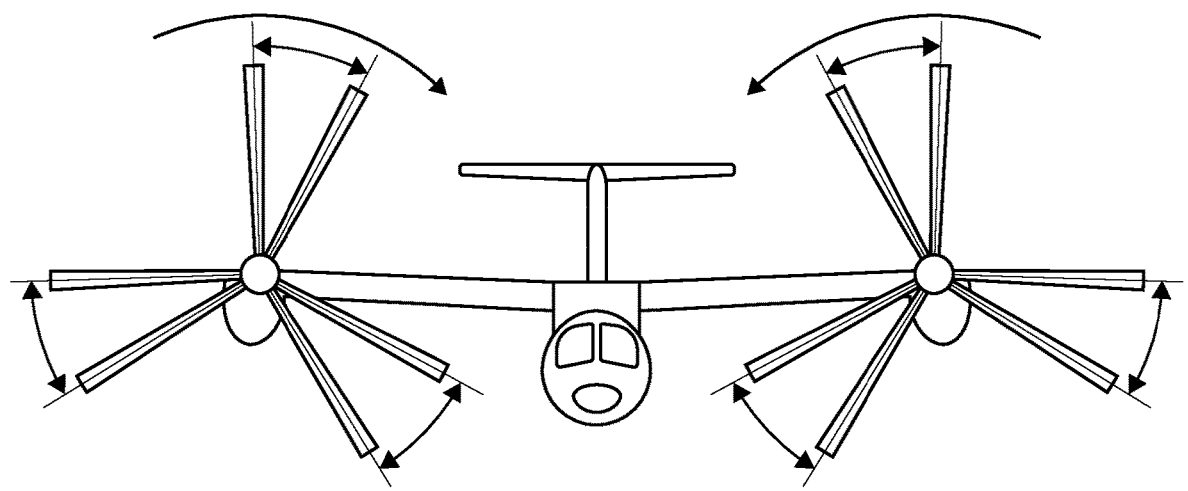
FIG. 2 shows a prior art aircraft.
Figure 3:
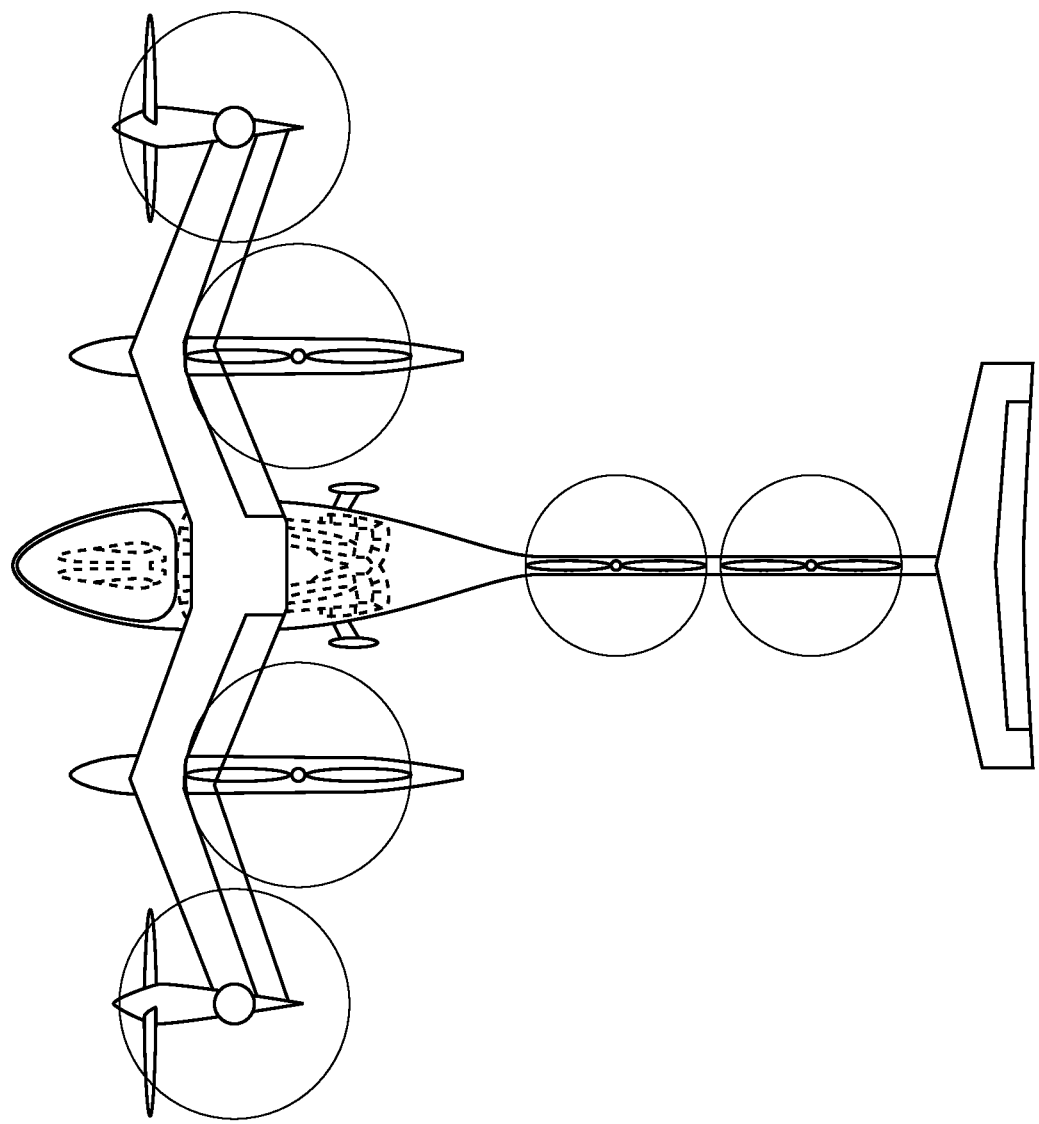
FIG. 3 shows an aircraft with six stacks of two small, co-rotating propellers.
Figure 4:
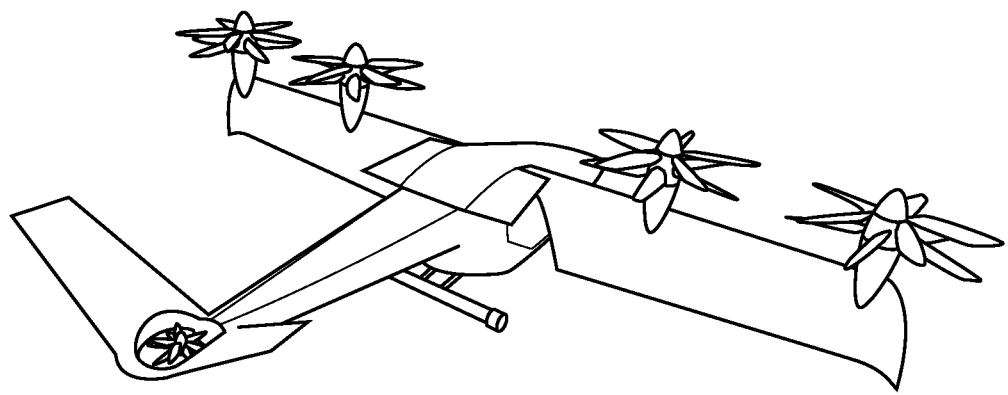
FIG. 4 shows Airspace Experience Technology's MOBI-ONE, a tilt-wing aircraft with eight small rotors arranged in four co-rotating coaxial stacks of two rotors each.
Figure 5A:
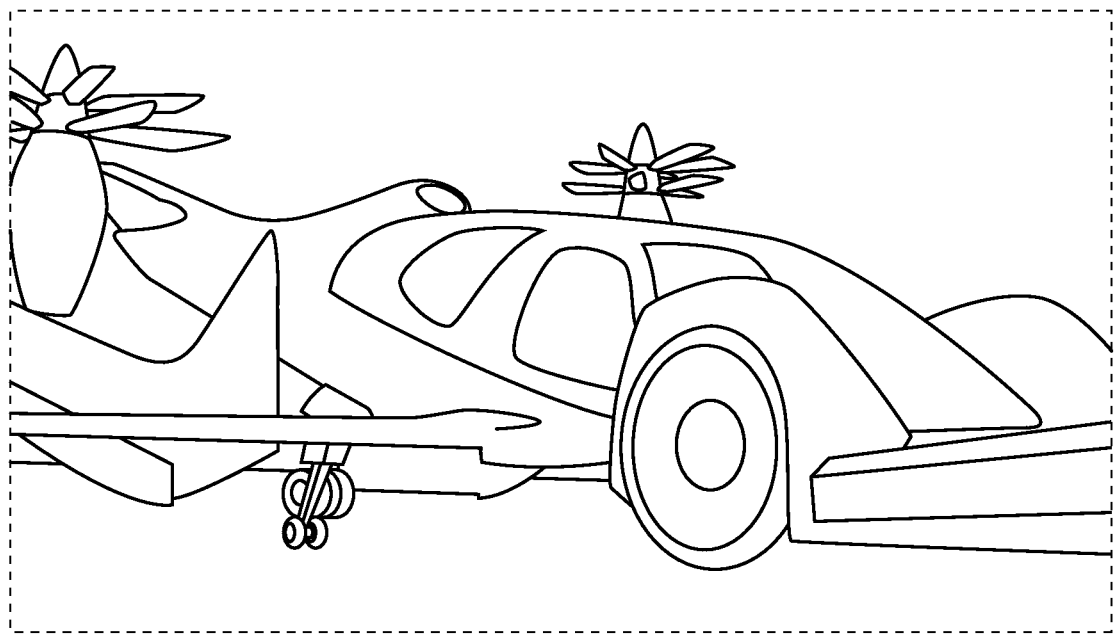
FIG. 5A shows Embraer's™ PULSE concept, a tiltrotor aircraft with four rotors arranged in two tilting coaxial rotor stacks.
Figure 5B:
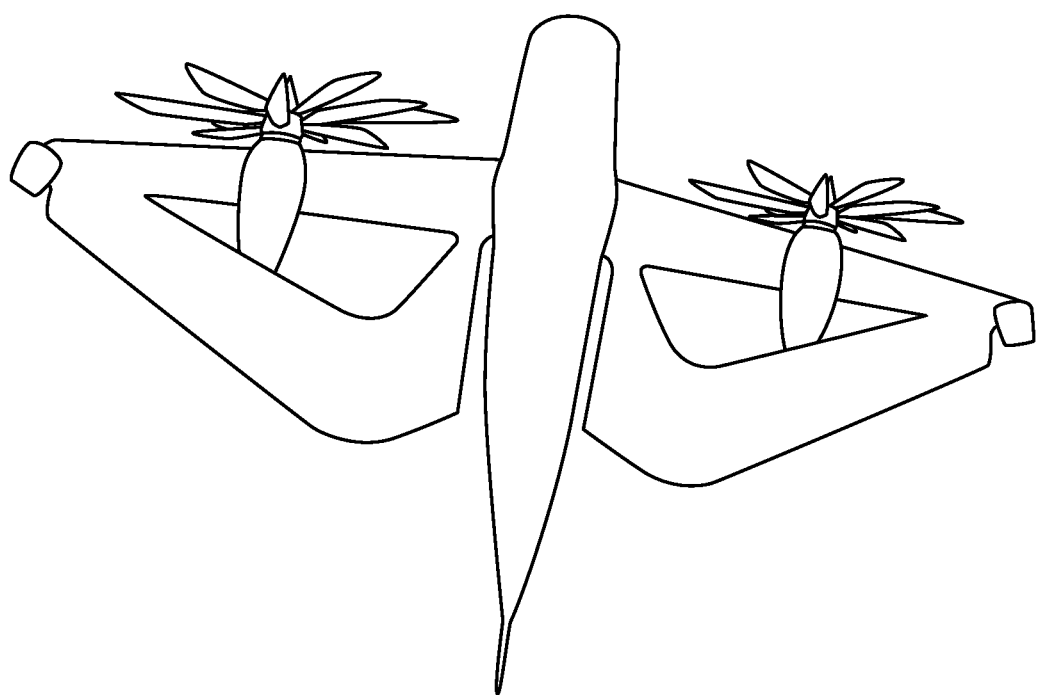
FIG. 5B shows an alternate view of Embraer's™ PULSE concept, a tiltrotor aircraft with four rotors arranged in two tilting coaxial rotor stacks.
Figure 6:
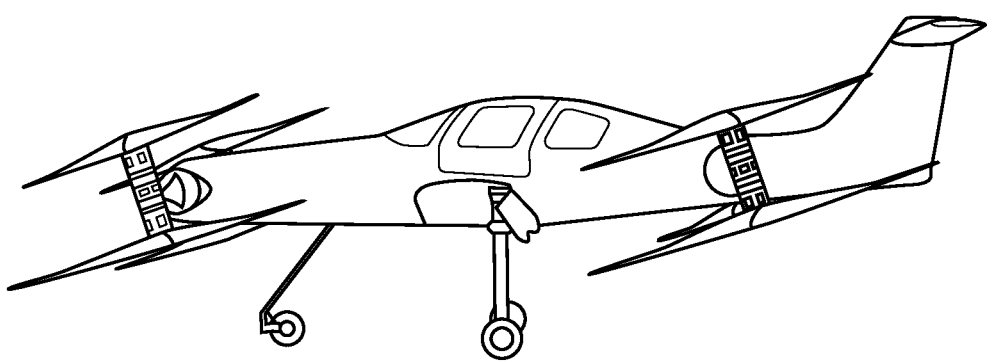
FIG. 6 shows a VTOL aircraft with four coaxial stacks of two rotors each for a total of eight rotors.
Figure 7:
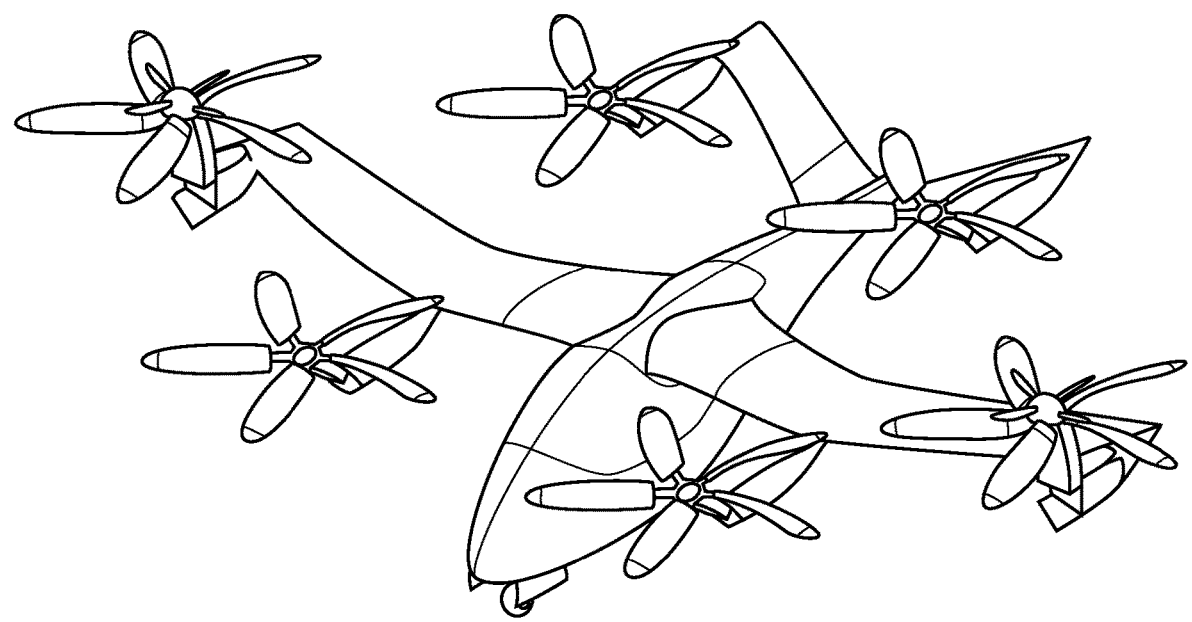
FIG. 7 shows the Joby™ six rotor VTOL.

In the prior art, there is a tradeoff between configurations that can sustain VTOL flight with one rotor system inoperable (but have less desirable power loading, noise, and possibly complexity characteristics) and those in which at least one rotor or drive system is flight critical (but tend to have more desirable power loading, noise, and possibly complexity characteristics).

With regards specifically to coaxial VTOL designs, even in cases in which the prior art contemplates the use of coaxial stacks of propellers, the use of such rotors is primarily in line with the conventional wisdom of: using smaller rotors which are easier to design and operate; often do not require a gearbox or similar mechanical complexity; and allow for redundancy by including extra rotors as needed.

Prevailing wisdom teaches that coaxial rotors, if used, provide an increase in power loading, and either a reduction in noise if co-rotating, or improved torque balance if counter-rotating. It is against prevailing wisdom to size each rotor system (including the associated gear reduction systems, engines, motors, and batteries) in a coaxial stack to provide all of the thrust needed for controlled flight without the other rotor (for example, in an aircraft with only two coaxial rotor stacks), as this would result in a more than 200% oversizing of the rotor system to both compensate for the lost thrust of the second rotor and to overcome the additional inefficiencies of an inoperable rotor in the rotor slipstream. Designers using a coaxial rotor system for increased power loading would not size each rotor system in a coaxial rotor set to be both independently driven and capable of providing all of the thrust needed out of the set with one rotor inoperative due to the increased weight and complexity of the system. A coaxial rotor set of a certain diameter and solidity uses less overall power to achieve a given thrust than a single rotor of the same diameter and solidity would use for the same thrust. Additionally, the power and torque required by each rotor system in a coaxial set is approximately half of the overall rotor system power; this means a coaxial rotor set design—such as some of the designs implemented in some embodiments herein—would defeat the POSITA's perceived advantage of using coaxial rotors for decreasing the power required. Oversizing rotor systems to enable VTOL flight with one rotor inoperable requires far more installed power—not less—than a single rotor system.

What the prior art does not teach is a VTOL aircraft with fewer than five rotors—either stacked into two primary coaxial rotor stacks or otherwise implemented—with low overall disk loading, sized and dimensioned such the aircraft is able to take off and land safely in a controlled manner even where a complete rotor system is inoperable. Such an approach is contrary to the prevailing wisdom, which teaches that system redundancy requires numerous rotors, typically five or more, to accommodate controlled VTOL flight after a complete rotor system failure or that system redundancy is weight prohibitive and the vehicle design instead assumes at least one rotor or drive system is flight critical, requiring a component-level reliability of approximately $10^{-9}$ failures per flight hour which, assuming feasible, would increase manufacturing and maintenance costs.

In some embodiments presented herein, a VTOL aircraft has four primary rotors—arranged in two primary coaxial rotor stacks or otherwise implemented—designed and sized for redundancy of each rotor system. Such a design may replace critical rotor systems with coaxial rotor sets, each of which has two or more independently-driven rotor systems. Other embodiments may utilize non-coaxial rotor systems in which the four primary rotors are arranged in a quad configuration.

With regards to coaxial implementations, unlike prior art coaxial rotors which are designed primarily for anti-torque (no tail rotor), high-speed edgewise advance ratio, or increased power loading, some embodiments described herein provide coaxial rotor sets that are designed for redundancy and safety. Specifically, each coaxial rotor set is designed such that each of the individual rotor systems in the set are independently driven and are capable of providing all of the thrust required from the flight-critical coaxial rotor set for controlled VTOL flight, including takeoff.

In some coaxial embodiments, the rotor systems are driven by torque-producing sources (most likely motors or engines); the design may have either a large excess of installed power if each torque-producing source can drive only one of the rotors, or the system is so designed such that each motor or engine can drive either one rotor or the other depending on failure mode. The gear reduction systems and motors or engines driving each rotor are also sized to provide sufficient power for a single rotor in a stack to provide all of the thrust needed from the complete stack. If the aircraft is battery-powered, the battery system architecture provides sufficient battery power to the motors or other torque-producing devices driving the operable rotors. Further, the aircraft has a method of balancing aircraft yaw moment when one of the rotor systems in a coaxial set is inoperable. In some embodiments, the method may involve shutting down a rotor system in one or more of the other coaxial rotor sets, varying the speed and collective in the other coaxial rotor sets to vary the yaw moment contribution of each, applying differential rotor nacelle tilt angles to generate offsetting yaw moment, or other methods.

Some of the inventive concepts disclosed herein achieve the increased levels of safety required for aerial transport of people and cargo without the typical trade-offs of high disk loading or increased rotor counts; such approaches allow for large-diameter rotors without making these rotors and associated drivetrains safety-critical.

Particular embodiments of the invention disclosed herein may provide apparatus, systems and methods in which an electric powered vertical takeoff and landing (eVTOL) aircraft is engineered to carry at least 400 pounds (approximately 181 kg) using two coaxial rotor stacks, each stack comprised of two variable pitch rotor systems axially aligned about a substantially common axis of rotation with each variable pitch rotor being independently driven by preferably one or more electric motors, but potentially any other torque-producing device such as a fuel-consuming engine. In one embodiment, each variable pitch rotor system is preferably a variable speed rigid (non-articulated) rotor. Additionally, the rotors are preferably tiltrotors-configured to remain axially aligned to each other while tilting relative to the main body. One or more of the rotors provides a significant amount of lift during rotor borne flight (e.g., vertical takeoff, etc), and can be tilted to provide forward thrust (or air braking) during wingborne flight. For clarity— in some embodiments—the relative azimuthal angle between the two variable pitch rotor systems in a coaxial stack is not fixed; each variable pitch rotor system is able to rotate about the substantially common axis of rotation independent of the other variable pitch rotor system. To the extent that the rotors tilt, both variable pitch rotor systems are configured to tilt together. The variable pitch rotor may comprise a first blade, wherein the flap stiffness of the first blade in the variable speed variable pitch rotor in lbs-in^2 at 30% of rotor root radius is at least 200 times the rotor diameter in feet to the fourth power such as the rotor taught in U.S. Pat. No. 6,641,365 (Karem), incorporated herein by reference. In some embodiments, the variable pitch rotor is configured to operate at an RPM level less than 80% or even 60% of a maximum rotor system RPM level.

Some embodiments of the invention disclosed herein are contemplated especially for aircraft engineered to carry at least 400 pounds, which is approximately the payload capability needed to carry more than one human or an equivalent amount of other payload. VTOL aircraft are subject to square-cube scaling laws in which an aircraft that is dimensionally scaled to a larger size by a scale factor will experience weight growth by approximately the cube of the scale factor while rotor areas, wing areas, structural spar depths (which provide strength and stiffness) and other such parameters will only increase by approximately the square of the scale factor. The results are three-fold. First, the necessary structural strength, stiffness, and aeroelastic margins will become harder to maintain at larger scales. Second, the power required to hover, which already grows super-linearly with aircraft weight at a given rotor disk area, will also grow super-linearly as the vehicle's overall size grows; this means the power margins needed for propulsive redundancy grow unfavorably with size. The result is that design techniques employed in toys and smaller aircraft, particularly those designed to carry the equivalent of fewer than two humans, are not particularly predisposed to working for larger aircraft where power needs and design complexity are much higher. The inventive concepts contained herein may be particularly well suited to address the needs of aircraft capable of carrying more than 400 lbs.

Figure 8:
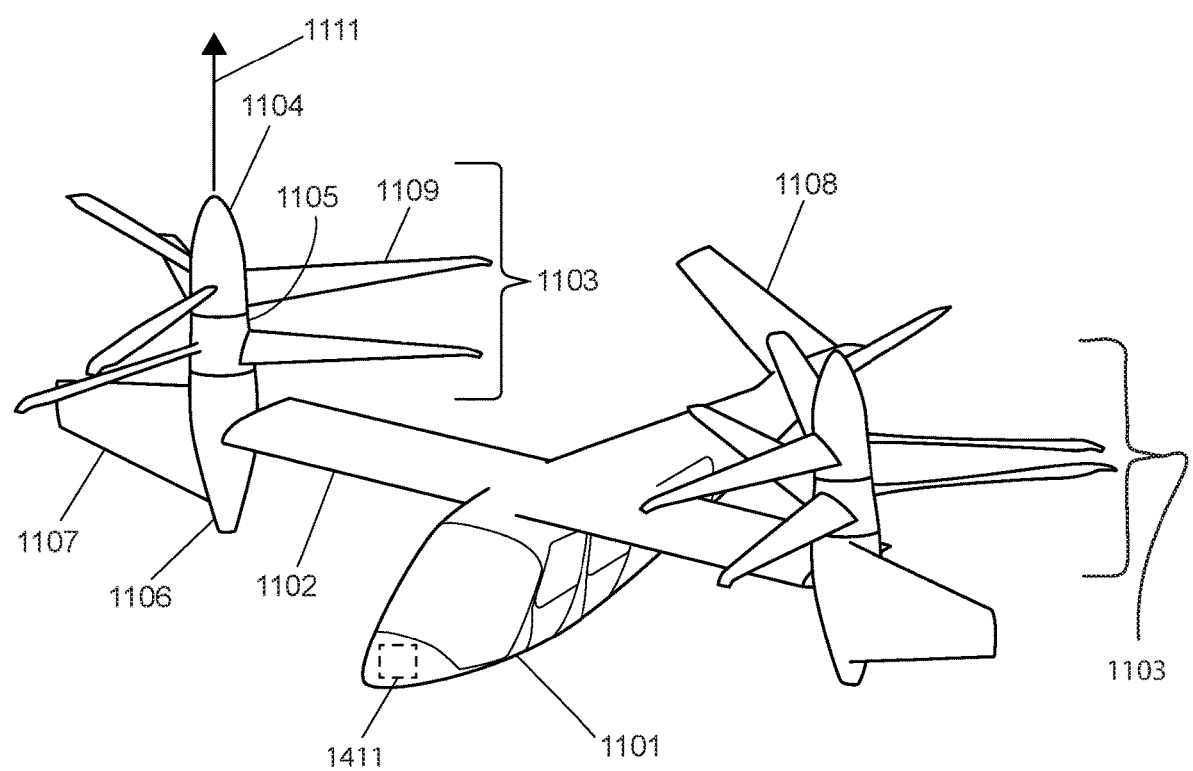
FIG. 8 is a perspective view of a preferred embodiment of a VTOL aircraft in hover according to the inventive concepts herein.

FIG. 8 is a perspective view of a preferred embodiment of a VTOL aircraft in hover. The aircraft has a main body 1101, inboard wing 1102, tilting nacelle 1106, tilting outboard wing 1107, first coaxial rotor stack 1103, and first tail surface 1108. The outboard wing 1107 tilts with the tilting nacelle 1106 to reduce download force from the rotor in hover mode. The first coaxial rotor stack 1103 comprises a first variable pitch rotor system 1104 and a second variable pitch rotor system 1105 rotatable about a substantially common axis of rotation—the rotors' axis of rotation—with each of the rotor systems being independently driven by at least one torque-producing source. The first and second variable pitch rotors may be configured to be co-rotating or counter-rotating.

This embodiment additionally comprises a second coaxial rotor stack 1103. The second coaxial rotor stack 1103 comprises a first variable pitch rotor system 1104 and a second variable pitch rotor system 1105 rotatable about a substantially common axis of rotation—the rotors' axis of rotation—with each of the rotor systems being independently driven by at least one torque-producing source.

First variable pitch rotor system 1104 includes rotor blades 1109. The rotor blades are of a stiff, hingeless variety, including for example as described in U.S. Pat. No. 6,641,365 (Karem). Each variable pitch rotor system independently provides thrust and force moments controlled by rotating the blades about a feather axis such as for the rotor system described in U.S. Pat. No. 10,351,235 (Karem), incorporated herein by reference; an electronic control system 1411 simultaneously controls both the rotational speed and rotor blade pitch for each variable pitch rotor system to both trim the rotor forces and moments according to the electronic flight control system, and to ensure the rotor operates at an optimum speed for optimal blade lift distribution, and hence, optimal efficiency and minimum required rotor torque applied by the torque-producing devices, as taught in U.S. Pat. No. 6,641,365. Inboard wing 1102 transmits loads from the coaxial rotor stack 1103 and outboard wing 1107 to the main body 1101.

Each of the first and second variable pitch rotor systems in each of the coaxial rotor stacks is able to provide sufficient thrust such that the aircraft is capable of controlled vertical takeoff and landing, even if up to one of the variable pitch rotor systems of each of the coaxial rotor stacks is inoperable. This requires that the total thrust needed from each coaxial stack, inclusive of additional rotor inefficiencies due to the inoperable rotor in the slipstream, can be provided by a single rotor. To calculate the total required thrust, one would consider the maximum gross weight of the aircraft and then use Computational Fluid Dynamics (CFD) methods to calculate the additional thrust needed to overcome airframe download due to the wing, main body, nacelles, tail, and inoperable rotors that may influence the rotor wake. One would further add additional thrust margin for controllability and maneuverability in the one rotor inoperable condition; in the preferred embodiment, such thrust margin may exceed 15%. One would then use CFD methods to calculate the rotor input torque and power needed to achieve the necessary thrust, including margin, in the desired operating conditions including air density and climb rate in the one rotor inoperable case. This required rotor torque would further be used to size the torque and power ratings for each element in the powertrain including the gear reduction system, torque-producing devices, and power distribution system (including batteries for embodiments in which the torque-producing devices are electric motors); the power and torque ratings for each powertrain element would further account for the efficiency losses in each element of the powertrain system.

Each of the first variable pitch rotor system 1104 and second variable pitch rotor system 1105 in a coaxial rotor stack 1103 may also be sized such that each of the first and second variable pitch rotor systems can provide all of the thrust commanded by the electronic flight control system for the entire coaxial rotor stack, even if one rotor is inoperable. To accomplish this, the electronic control system may command an increased RPM and power for the operable variable pitch rotor. The increased RPM and power for the required thrust margin are calculated by Computational Fluid Dynamics (CFD) methods for the particular rotor configuration, including the presence of the inoperable rotor, when sizing the rotor with the result validated by the physical rig testing of the combination of rotors, nacelle, and adjacent wing surfaces. In flight, the commanded RPM, blade pitch, and power is commanded by the electronic flight control system based on measured feedback of the aircraft's linear and angular velocity and acceleration for all three axes. The torque-producing devices and gear reduction systems (illustrated in FIGS. 11, 12, and 13) are similarly sized with sufficient margin for the one rotor inoperative case. If the aircraft is battery-powered, then the battery and distribution system would be sized to provide sufficient power to the operable rotors in each inoperable rotor scenario. Such sizing would occur at maximum gross takeoff weight at the highest pressure altitude desired for operation at a sufficient vertical rate of climb, typically greater than 100 feet per minute, along with additional margin for control power, cross wind, and trim penalty as dictated by the desired flight envelope.

The main body 1101 is designed to carry payload such as passengers, luggage, or cargo and contains various systems including a landing gear in configurations such as those described in detail in U.S. Pat. No. 10,351,235 (Karem), incorporated herein by reference. In the preferred embodiment, the offset of the vehicle center of gravity from the center of the coaxial rotor stacks is controlled by mast moment from the rigid variable pitch rotor systems, which necessarily requires rotor cyclic control.

In one exemplary embodiment, the aircraft of FIG. 8 has a maximum gross takeoff weight of 6,000 lb. The aircraft has one pilot seat and four passenger seats, as well as a luggage hold. The aircraft's main body is 33 ft in length with a 5.0 ft maximum width and a 5.5 ft maximum height. The aircraft's wingspan is 45 ft and the spanwise distance between the two coaxial rotor stack centers is 30 ft. The variable pitch rotor systems in the left and right coaxial rotor stacks have a diameter of 21 ft for a non-overlapping rotor disk area of 693 ft$^2$ and a disk loading of 8.7 lb/ft$^2$ based on the fully non-overlapping area and 4.3 lb/ft$^2$ based on total overlapping disk area. Each variable pitch rotor system is driven by four motors through a single speed gear reduction system; in hover during nominal operating conditions, the motor input speed is 10,000 RPM and the variable pitch rotor system output speed is 400 RPM. However, any number of electric motors could be configured to drive each variable pitch rotor system through the gear reduction system, for example one, or two, or three. Each motor preferably has a maximum continuous power rating of 90 kW and a maximum emergency power rating of 110 kW; however, the vehicle will typically use less than half of the maximum continuous power rating in hover in most nominal operating conditions. The vehicle's sixteen motors are powered by eight batteries, each capable of outputting 120 kW.

If one variable pitch rotor system becomes inoperable, the electronic control system may increase the speed of the remaining operable rotor to 533 RPM and increase blade pitch to maintain rotor operation near the rotor's peak efficiency thrust coefficient while providing the same thrust as in the nominal operating condition. Importantly, the motor oversizing in some embodiments described herein allows the vehicle to maintain positive performance margins in both vertical climb out of ground effect (with at least 100 ft/min climb) and control power (with at least, for example, 25% control power margin for vehicle handling in urban environments) at a pressure altitude of at least 5,000 ft. In a rotor system failure condition, the vehicle of some embodiments described herein allows the pilot to maintain controlled flight and transition to wingborne flight where much less power is required; it also allows the pilot to vertically takeoff and climb out of ground effect if required, for example in an aborted landing scenario. The same is also true if a battery pack fails when all rotors are operating nominally; one could additionally oversize the batteries to allow for combined battery and rotor-drive failures.

Figure 9:
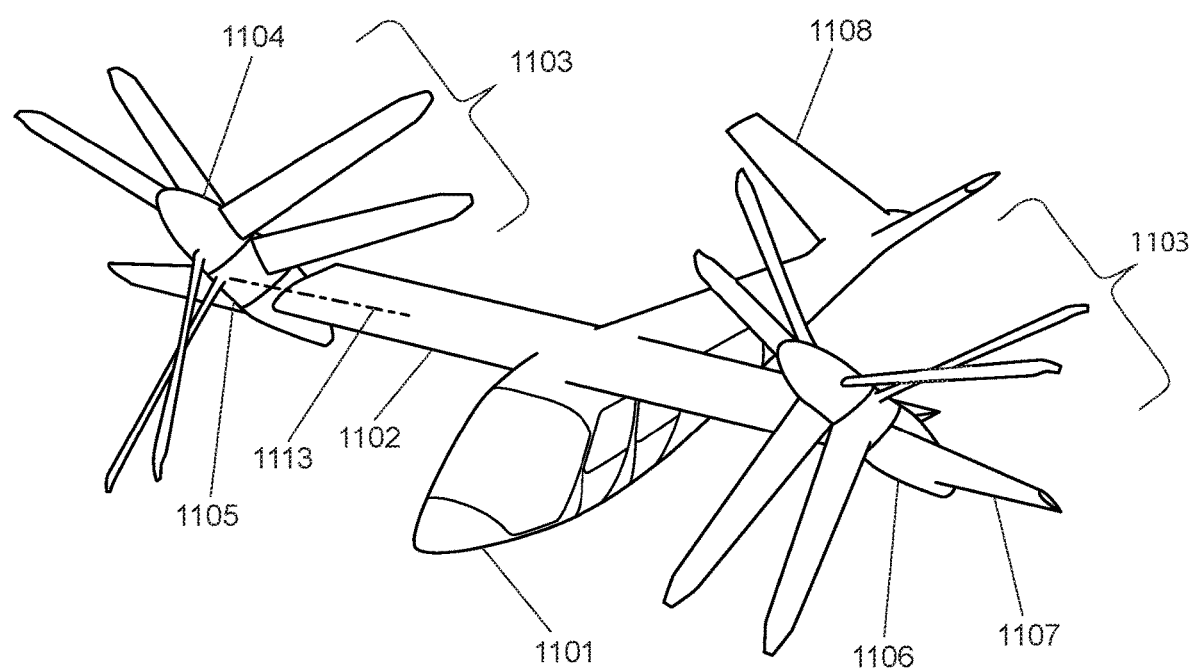
FIG. 9 is a perspective view of preferred embodiment of FIG. 8, but shown in transition.
Figure 10:
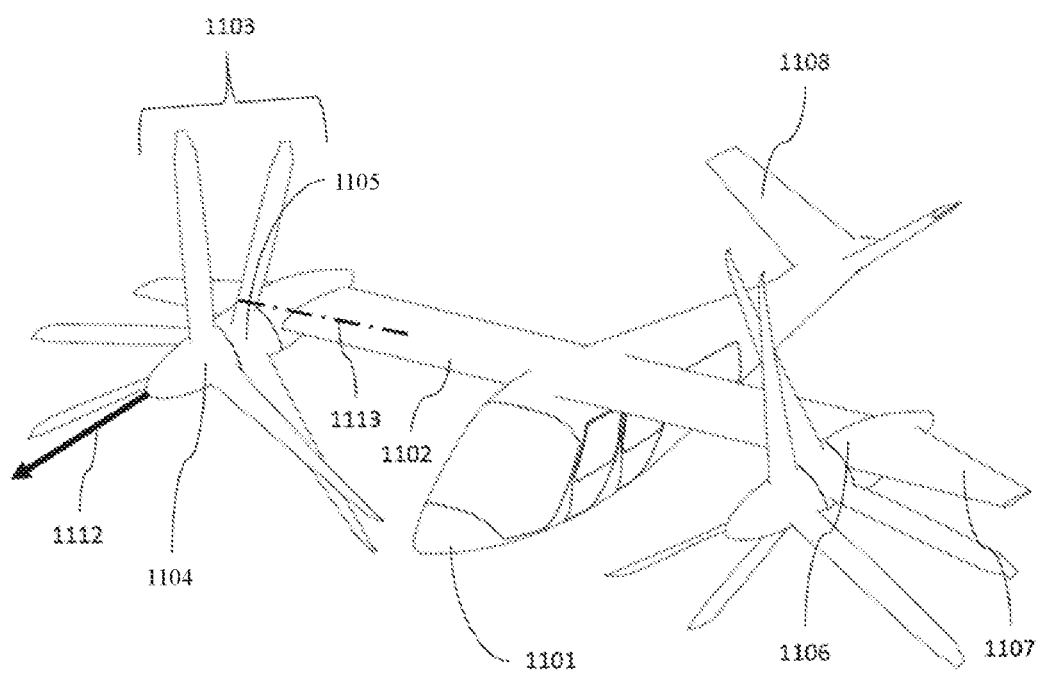
FIG. 10 is a perspective view of preferred embodiment of FIG. 10, but shown in cruise position.

FIGS. 9 and 10 show a perspective view of the preferred embodiment in transition and cruise, respectively, consistent with the aircraft represented in FIG. 8. As the tilting nacelle 1106 tilts the coaxial rotor stack 1103 about a tilt axis 1113 from a hover position with a vertical thrust vector 1111 (as shown in FIG. 8) to a cruise position with a horizontal thrust vector 1112 (as shown in FIG. 10), the outboard wing 1107 tilts from a vertical position into a horizontal position with similar angle of attack as the inboard wing 1102. The outboard wing increases the vehicle's overall wing aspect ratio for decreased cruise drag; in the preferred embodiment, the main wing has an overall wing aspect ratio of at least 6, and preferably more than 8.

To achieve preferred levels of safe and efficient flight in hover, transition, and cruise, aircraft contemplated herein may be designed according to the aerodynamic design teachings of U.S. Pat. No. 10,351,235 (Karem), incorporated by reference in its entirety. In such embodiments, aircraft are designed to have a low wingborne stall speed of 80 KIAS or less and preferably 60 KIAS or less; the low stall speed provides a wide transition corridor, allowing for the vehicle to tilt its rotors from hover mode to cruise mode at low airspeed. Such aircraft may also advantageously use a slotted wing flap as taught in US20200239127A1 (Karem), incorporated herein by reference, to reduce the vehicle stall speed while providing for a wing area that is efficient in higher speed cruise. In some embodiments, the vehicles are designed to be efficient in cruise with a lift to drag ratio of at least 9 and preferably at least 13 at a cruise speed of 130 KTAS.

Figure 11:
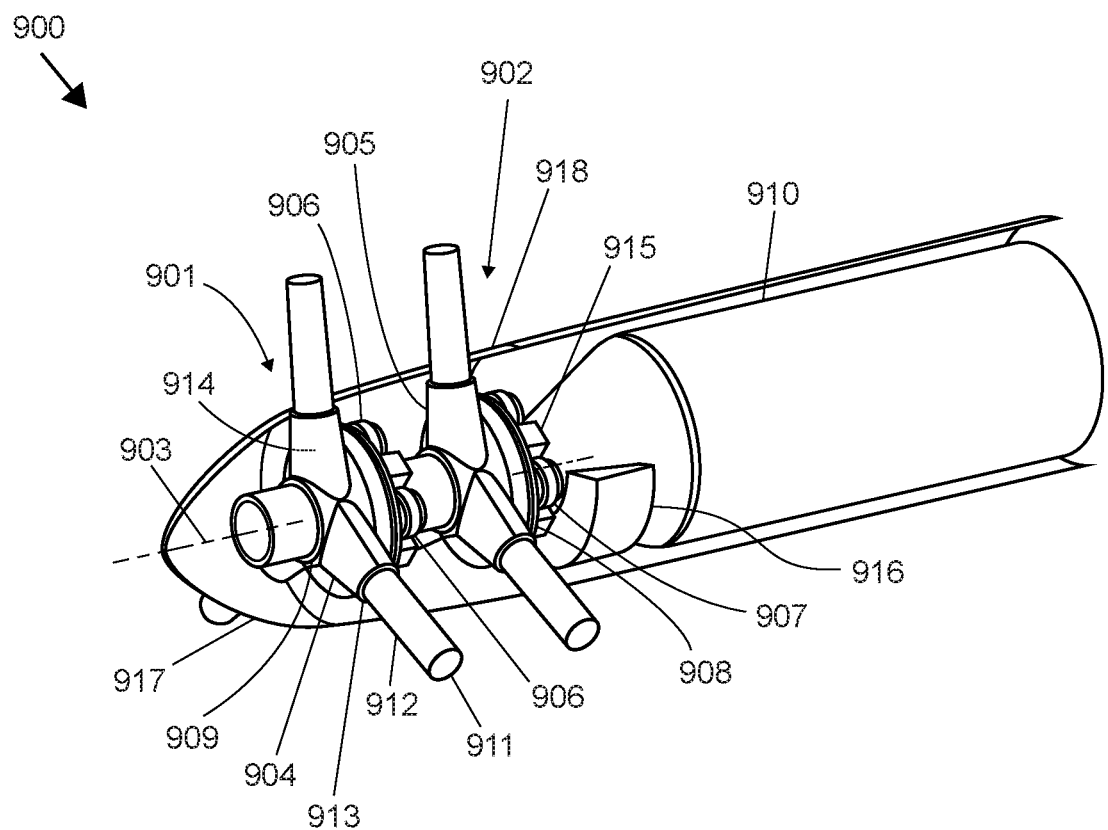
FIG. 11 shows a possible embodiment of drive system 900 for a two-rotor co-axial stack.
Figure 12:
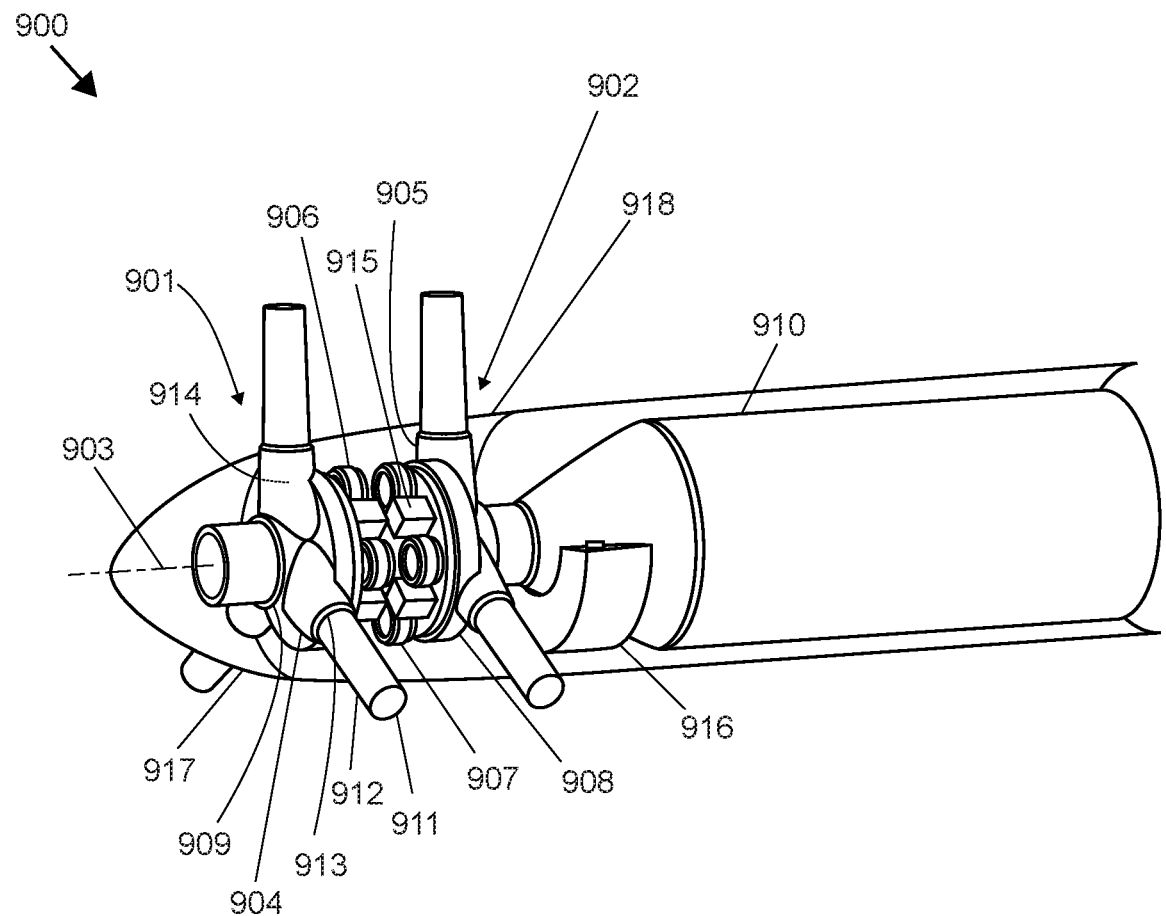
FIG. 12 shows a possible alternate embodiment of drive system 900 for a two-rotor co-axial stack.

FIGS. 11 and 12 show perspective views of two embodiments of integrating drive system 900 for a two-rotor co-axially rotating stack, forward rotor system 901 and aft rotor system 902 rotating about common axis 903. FIG. 11 illustrates duplicated common assemblies, and FIG. 12 illustrates a back-to-back motor and gear reduction system arrangement. The rotors are capable of co-rotation with the ability of having either the forward or aft rotor to be static when disabled, while the serviceable rotor continues to rotate. Forward rotor hub 904 and aft rotor hub 905 are driven by forward motors 906 or aft motors 907 through reduction gearing 908. The hubs 904 and 905 rotate on bearings 909 co-axially mounted on structural nacelle extension 910. The collective and cyclic pitch of the blades 911 with blade shanks 912 located in feather bearings 913 may be controlled by rotary actuators 914 located within the hubs 904 and 905, with electronic control of both motor speed and blade pitch effected by control and driver modules 915. The drive system is lubricated and cooled by oil contained in tank 916, and independent spinner assemblies 917 and 918 enclose the hub systems.

Figure 13:
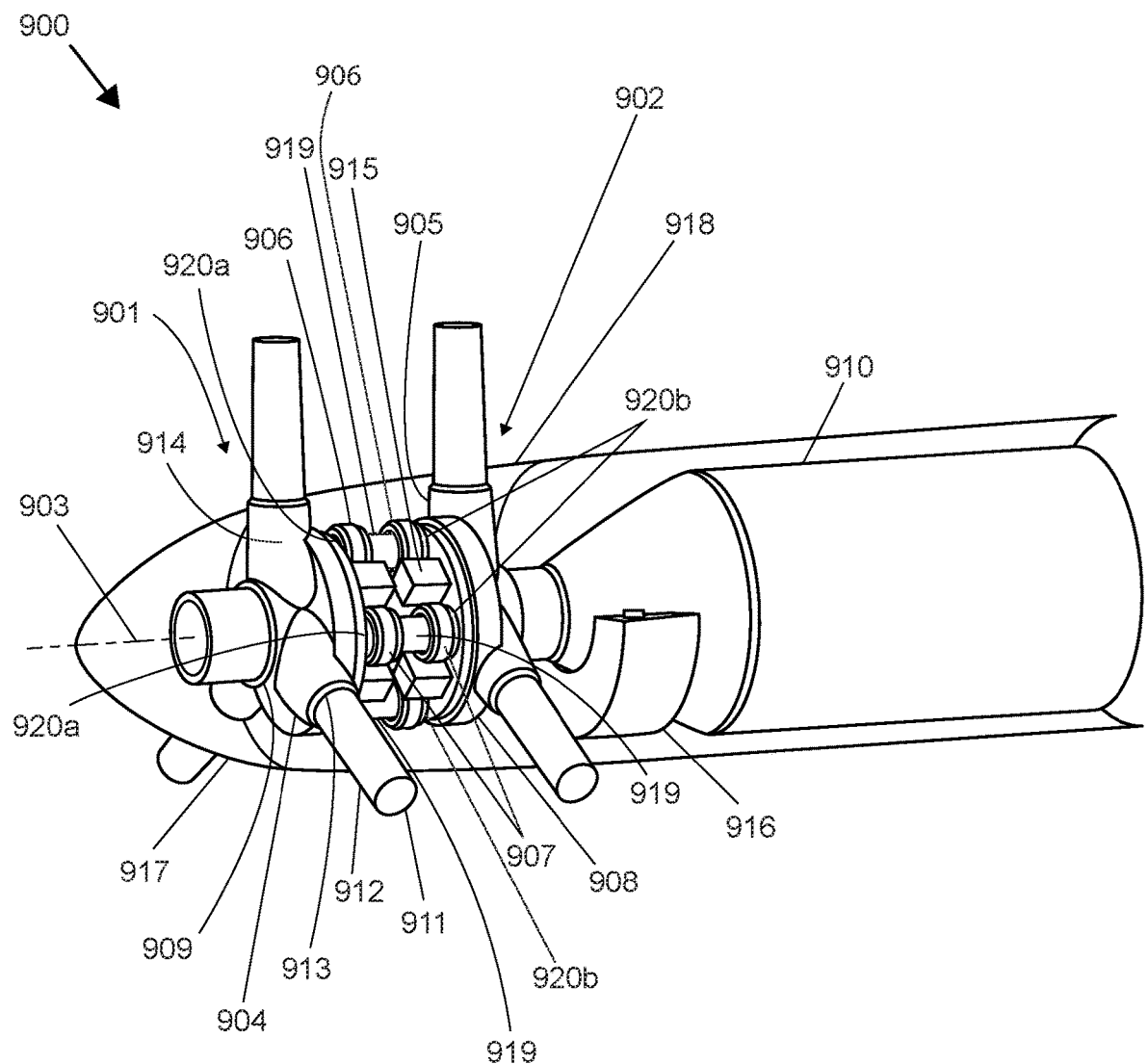
FIG. 13 shows another possible alternate embodiment of drive system 900 for a two-rotor co-axial stack.

In one embodiment, such as the one shown in FIG. 13, drive system 900 can be configured such that forward motors 906 and aft motors 907 are torque connected by way of connecting shafts 919 allowing power sharing between the forward and aft variable pitch rotor systems. In such an embodiment, the drive system 900 is configured such that aft motors 907 and forward motors 906 can drive either forward rotor hub 904 or aft rotor hub 905 or both rotor hub 904 and rotor hub 905. In such a configuration the forward hub can be driven by forward motors and aft motors without the aft hub being driven, for example if the aft reduction gear reduction system 908 is jammed. Likewise, the aft hub can be driven by forward motors and aft motors without the forward hub being driven. A clutch, such as a directional clutch 920*a* or 920*b*—not visible in FIG. 13, can be configured such that causing the forward motors and aft motors to drive a first direction causes a first variable pitch rotor system to be driven; and causing the forward and aft motors to drive a second direction causes a second variable pitch rotor system to be driven. Such an embodiment is preferred because the installed power requirement to drive only one of the variable pitch rotor systems is reduced, as the motors can be sized such that four motors are used to drive a single operable rotor system instead two sets of motors each driving a respective motor.

Figure 14:
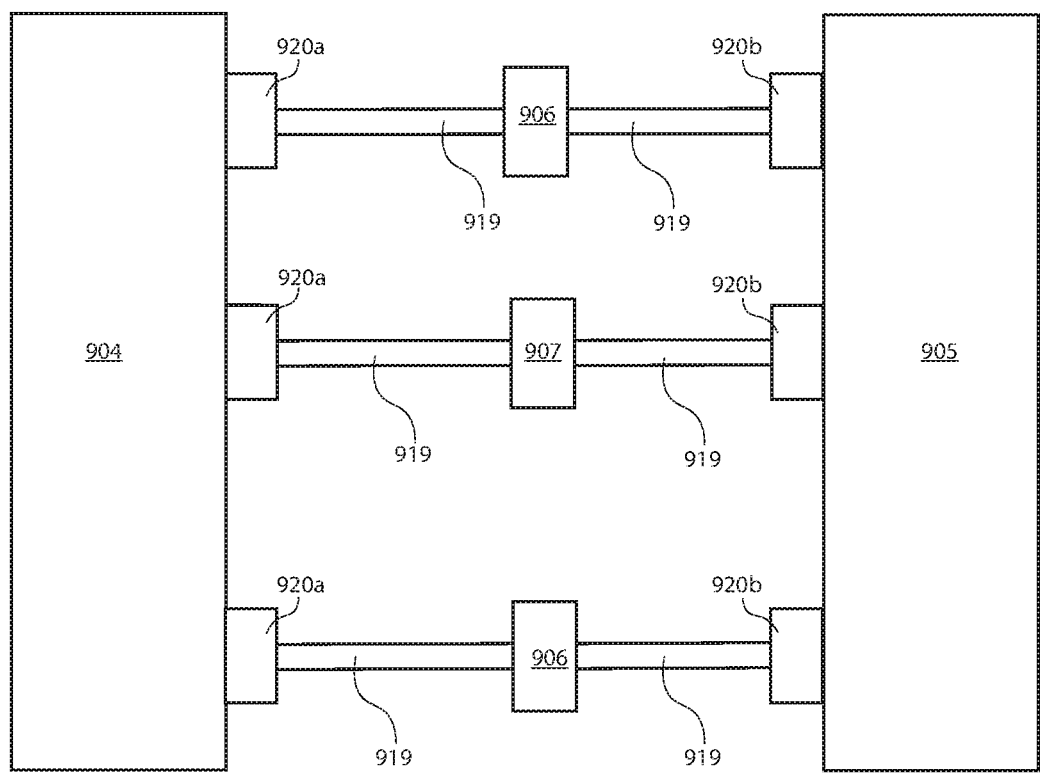
FIG. 14 shows a possible alternate embodiment of drive system 900 for a two-rotor co-axial stack.

As illustrated in FIG. 14, some embodiments may implement motors torque connected to both rotors in a coaxial stack. Motors 906 and 907 may be interposed in between sections of connecting shaft 919. Between each end of the connecting shaft 919 and the respective gear reduction system, directional clutches 920*a* and 920*b* may be interposed. In a counter rotating embodiment for example, motor 906 may be configured to drive connecting shaft 919 a first direction. The front directional clutch 920*a* may engage and drive the front gear reduction system and thus the front rotor. During normal operating conditions the aft directional clutch 920*b* connected to the same forward motor 906, would be configured to be disengaged. If the front rotor failed, forward motor 906 may reverse its direction of rotation, which would disengage the front directional clutch 920*a* and engage the aft directional clutch 920*b*. Thus, even in the instance of one rotor inoperable, all motors may be configured to generate thrust. Likewise, aft motors 907 may be configured to drive the aft rotor during nominal operating conditions and drive the front rotor in the instance that the rear rotor becomes inoperable. The directional clutches 920*a* and 920*b* may be configured to provide the desired nominal and fail mode operation characteristics. Visible in FIG. 14 are only three motors, but it should be understood there may be six motors (two addition aft motors 907 and one addition forward motor 906). Other embodiments may comprise any number of forward and aft motors, for example two, or four. The motors are illustrated in the middle of the forward and aft rotor hubs but may be located anywhere. Other implementations may comprise alternative methods of decoupling a connecting shaft from an inoperable rotor and enabling it to drive a still operable rotor, including a shear shaft.

Figure 15:
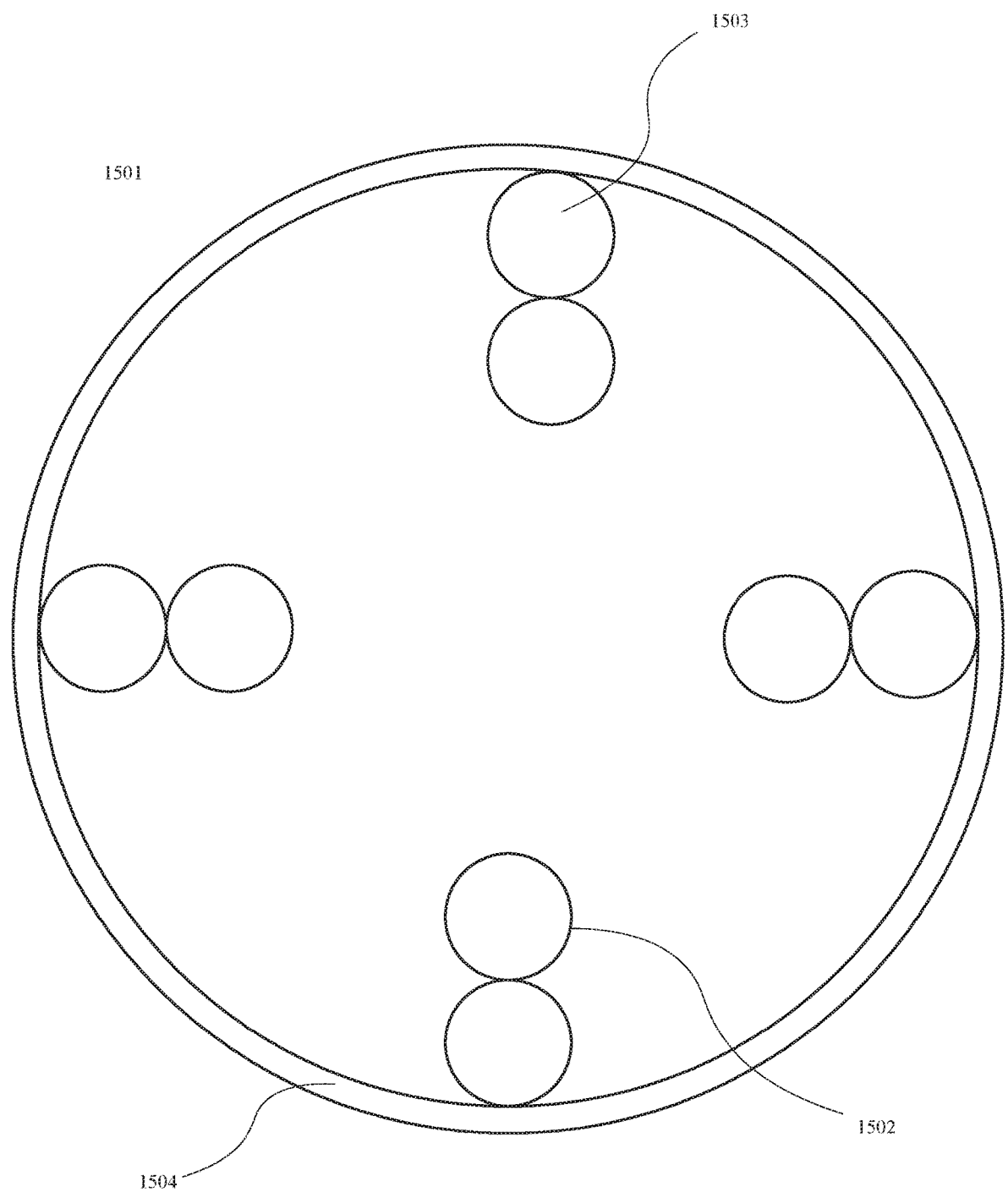
FIG. 15 shows one possible embodiment of a drive system reverser.

A co-rotating embodiment may comprise a reverser, such as reverser 1501 shown in FIG. 15. Said reverser is configured to allow aft motors 907 and forward motors 906 to drive either forward hub 904 or aft rotor hub 905. Reverser 1501 may have pinion gears 1502—which are driven by a connected motor, reverser gears 1503, and a ring gear 1504. Electric motors may be configured to drive pinion gears 1502 such that ring gear 1504 drives the respective hub the opposite direction than if the reverser where not interposed.

Figure 16:
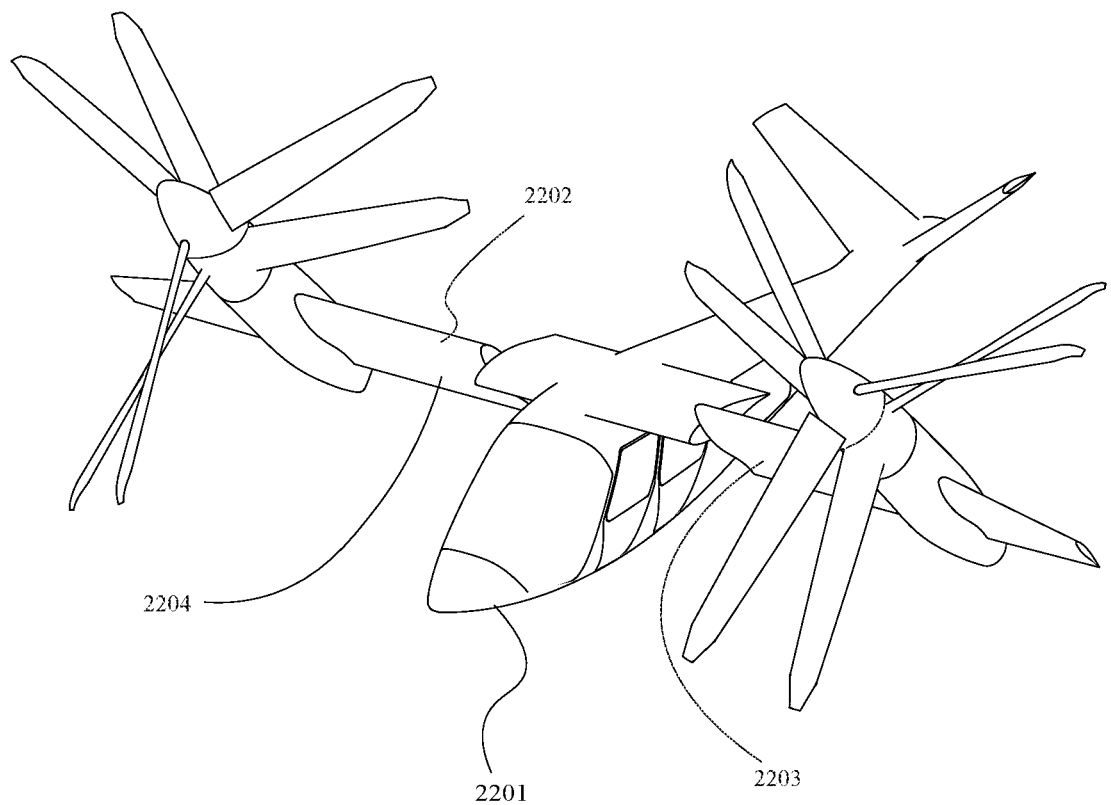
FIG. 16 an embodiment in which a first wing is configured to pivot relative to main body of the aircraft.

In one embodiment, shown in FIG. 16, first wing 2202 is configured to pivot relative to main body 2201. In some embodiments, first wing 2202 may compose a left wing 2203 and a right wing 2204, with each of the left wing and right wing configured to independently pivot about a substantially spanwise axis.

Figure 17:
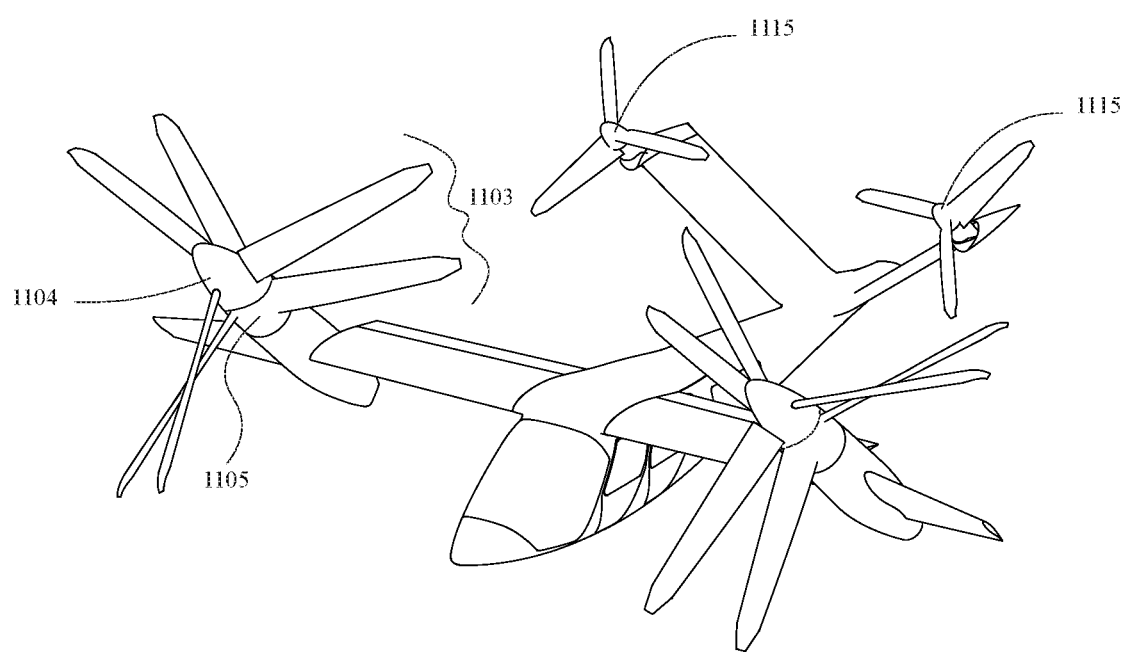
FIG. 17 shows an embodiment of the aircraft that comprises at least a first auxiliary rotor system in addition to the first and second coaxial rotor stacks.
Figure 18:
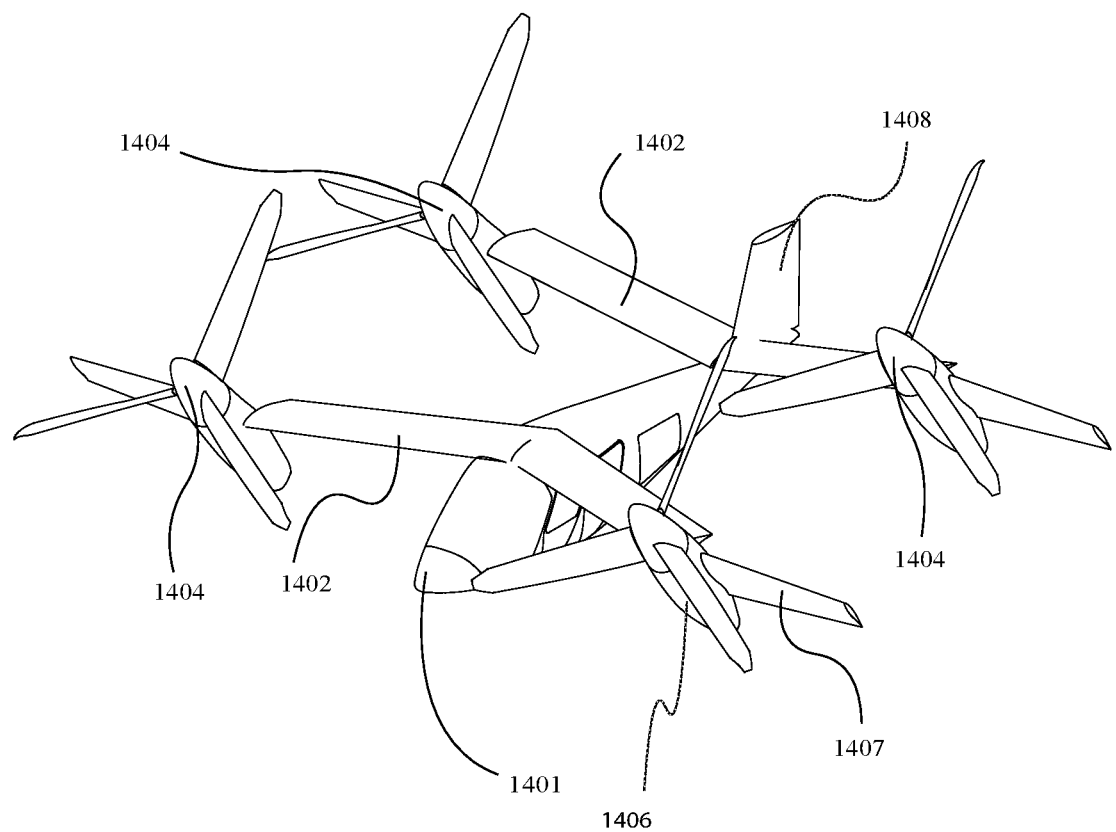
FIG. 18 shows an embodiment of an aircraft configured with four variable pitch rotors; the aircraft is shown in transition.

In another embodiment, shown in FIG. 17, the aircraft comprises at least a first auxiliary rotor system 1115 in addition to the first and second coaxial rotor stacks, such as the auxiliary rotors discussed in U.S. Patent 20180334251A1 (Karem), incorporated herein by reference. The aircraft may also comprise a second auxiliary rotor system 1115. In such an embodiment, each of the first and second variable pitch rotor systems in each of the coaxial rotor sets and the first and second auxiliary rotor system together may provide sufficient thrust such that the aircraft is capable of controlled vertical takeoff and landing, even if either up to one of the variable pitch rotor systems of each of the coaxial rotor stacks or up to one of the auxiliary rotor systems is inoperable. In one embodiment, the first auxiliary may have a rotor having a diameter no greater than 50% of the diameter of the first variable pitch rotor system. However, in some embodiments, the auxiliary rotor may be greater than 50%. Additionally, each of the auxiliary rotor systems may comprise a variable pitch rotor.

In some embodiments, four variable pitch rotor systems may be arranged in a quad configuration in which none of the rotors are coaxially aligned; similar to the coaxial embodiments, the variable pitch rotor systems are sized and proportioned to provide excess thrust margin so that the aircraft may accomplish flight in a one rotor inoperative state. While the prior art typically teaches that at least five rotors are required to sustain vertical takeoff and landing with one rotor inoperable, an aircraft with four variable pitch rotor systems is capable of controlled vertical takeoff and landing even with up to one variable pitch rotor system inoperable if designed according to the teachings herein.

Four rotors may be a preferred number of rotors because it may allow for VTOL operation with less than all four rotors operable, but also allows for large rotors. A fail operational four rotor tiltrotor capable of VTOL flight with less than all rotors may have unexpected advantageous benefits.

Figure 19:
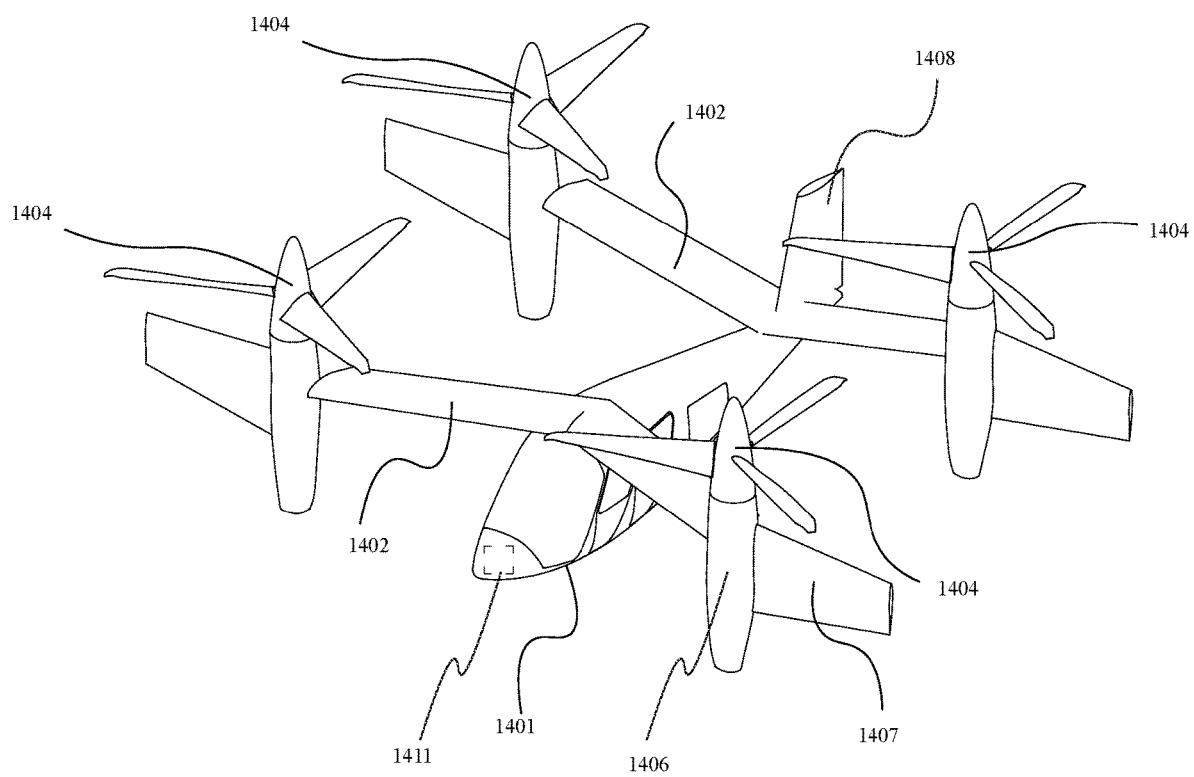
FIG. 19 shows an embodiment of an aircraft configured with four variable pitch rotors; the aircraft is shown in hover.

In one exemplary embodiment, shown in FIG. 19, the aircraft is configured with four variable pitch rotors: a first variable pitch rotor 1404, a second variable pitch rotor 1404, a third variable pitch rotor 1404, and a fourth variable pitch rotor 1404. The aircraft has a main body 1401, inboard wing 1402, tilting nacelle 1406, tilting outboard wing 1407, electronic flight control system 1411, and tail surface 1408. Each variable pitch rotor is configured to be driven by at least one torque-producing source.

In one especially preferred embodiment, the aircraft of FIG. 19 may have a maximum gross takeoff weight of 6,000 pounds and may be configured to carry at least 400 pounds. The aircraft has one pilot seat and four passenger seats, as well as a luggage hold. The aircraft's main body is 35 ft in length with a 5.0 ft maximum width and a 5.5 ft maximum height. The aircraft's wingspan is 49 ft and the spanwise distance between the two front variable pitch rotor centers is 29 ft. The variable pitch rotors have a diameter of 20 ft for a rotor disk area of 1,257 ft$^2$ and a disk loading of 4.77 lb/ft$^2$. Each variable pitch rotor is driven by four motors through a single speed gear reduction system; in hover during nominal operating conditions, the motor input speed is 10,000 RPM and the variable pitch rotor system output speed is 360 RPM. However, any number of electric motors could be configured to drive each variable pitch rotor through the gear reduction system, for example one, or two, or three. Each motor has a maximum continuous power rating of 70 kW and a maximum emergency power rating of 90 kW; however, the vehicle will typically use less than 40% of the maximum continuous power rating in hover in most nominal operating conditions. The vehicle's sixteen motors are powered by eight batteries, each capable of outputting at least 100 kW.

In such an embodiment, the variable pitch rotors may be sized such that no single rotor is flight critical. For flight in urban environments, where a system reliability on the order of $10^{-9}$ failures per flight hour is desired, the embodiment depicted in FIG. 19 may provide for said level of safety to be obtained at the aircraft level without requiring a similar subsystem or component reliability.

Figure 20:
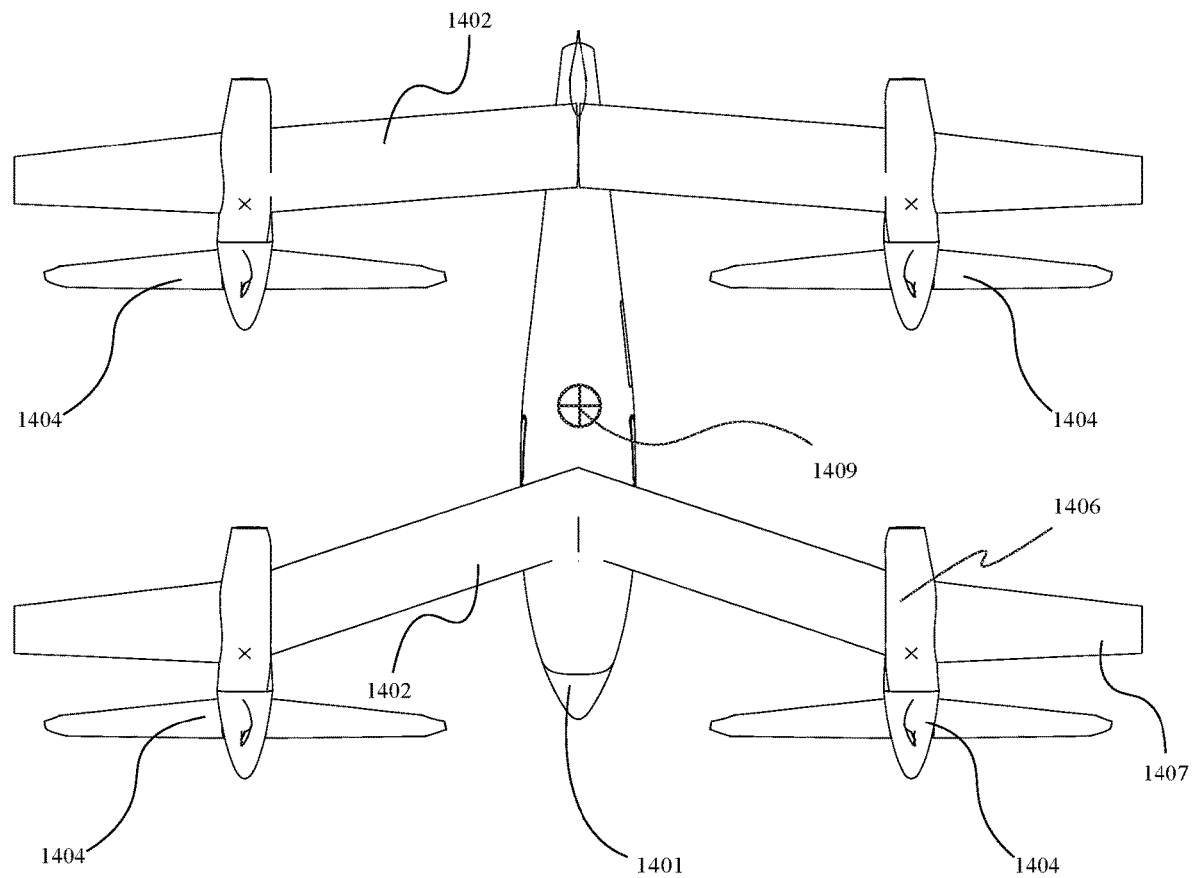
FIG. 20 shows an embodiment of an aircraft configured with four variable pitch rotors; the aircraft is shown in cruise position.

FIG. 20 shows an embodiment of an aircraft configured with four variable pitch rotors; the aircraft is shown in cruise position.

Figure 21:
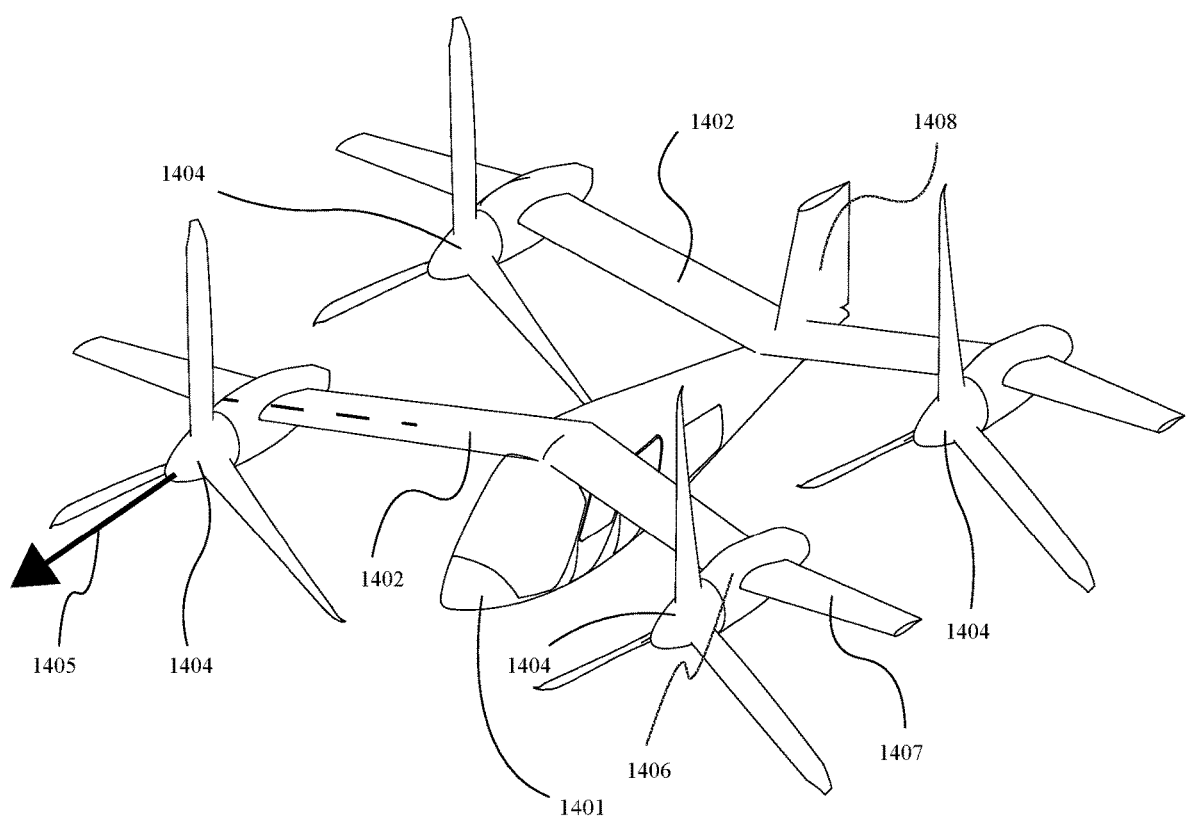
FIG. 21 shows a perspective view of the aircraft of FIG. 19.

FIG. 21 shows a perspective view of the aircraft of FIG. 19.

Figure 22:
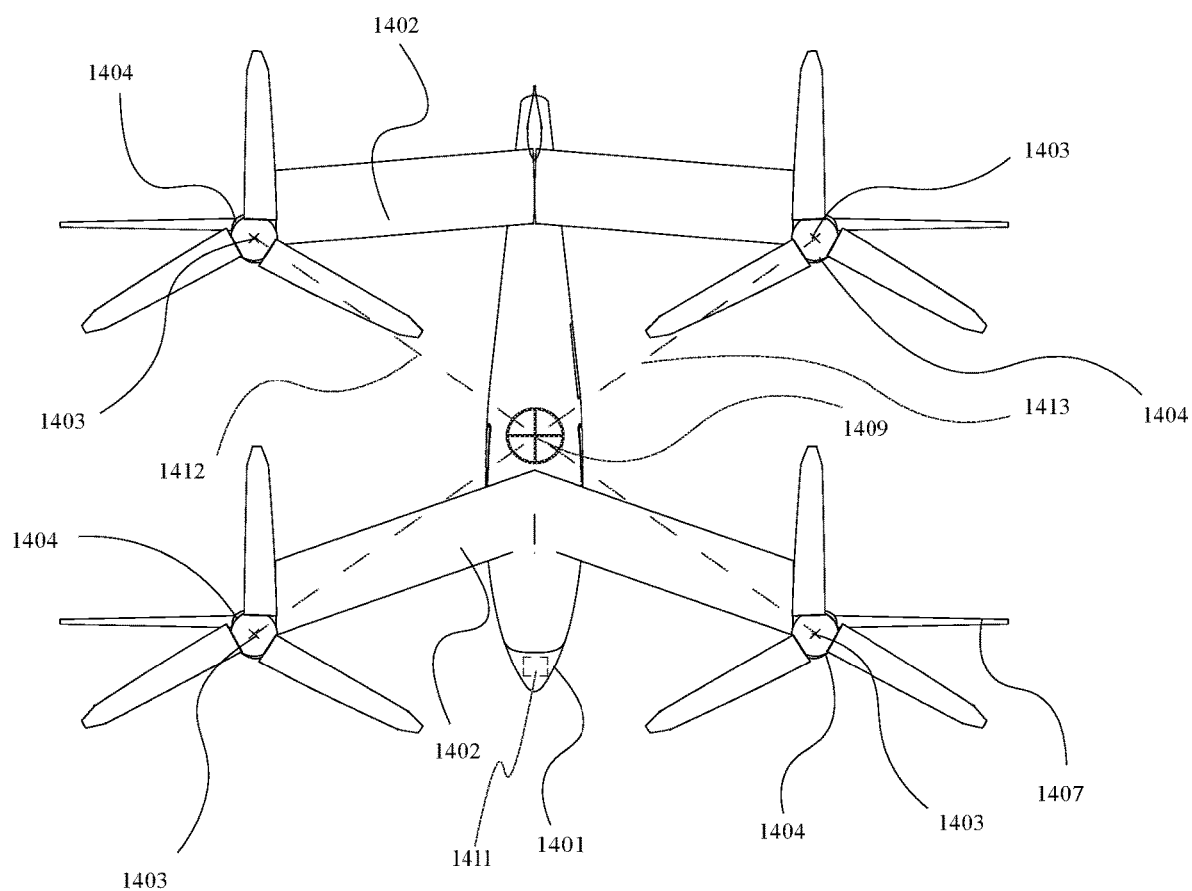
FIG. 22 shows a top view of an embodiment of an aircraft configured with four variable pitch rotors.

As shown in FIG. 22, the aircraft is configured such that center of gravity 1409 is located approximately at the intersection of a first diagonal line 1412 and a second diagonal line 1413, wherein the first and second diagonal lines connect the center of variable pitch rotor thrust 1403 of a first pair and a second pair of variable pitch rotors 1404, respectively. It should be understood that the center of gravity 1409 may be located within an envelope surrounding the intersection of a first diagonal line 1412 and a second diagonal line 1413. One of ordinary skill in the art will understand center of gravity 1409 will move around within a small envelope based on passenger and payload loading, etc. Thus, the location of the rotors relative to the aircraft center of gravity is configured such that the aircraft is capable of controlled vertical takeoff and landing, even if up to one of the variable pitch rotors 1404 is inoperable. Electronic control system 1411 may be configured to control the rotational speed and blade pitch of the variable pitch rotors. The variable pitch rotors on the left side of the main body may co-rotate. Additionally, the variable pitch rotors on the right side may co-rotate. The variable pitch rotors on the right side may rotate counter to the variable pitch rotors on the left side. The aircraft may have a second wing 1402. Preferably, the least one torque-producing source comprises an electric motor but may alternatively comprise a fuel consuming engine.

In FIG. 22, controlled vertical takeoff and landing is achieved by reducing power to the variable pitch rotor approximately across an envelope containing the center of gravity 1409 from an inoperable variable pitch rotor. For example, if forward left side variable pitch rotor 1404 became inoperable due to failure, electronic flight control system 1411 could reduce or cut power to aft right side variable pitch rotor 1404. Alternatively, the mast moment of the remaining variable pitch rotors may be used to correct for the imbalance created by the inoperable rotor. A combination of mast moment control and thrust control could be used to achieve controlled vertical takeoff and landing with fewer than all four variable pitch rotors. Variable pitch rotors 1404 and the connected torque providing sources are configured to provide enough thrust to achieve vertical takeoff and landing with one or more variable pitch rotor inoperable.

Figure 23:
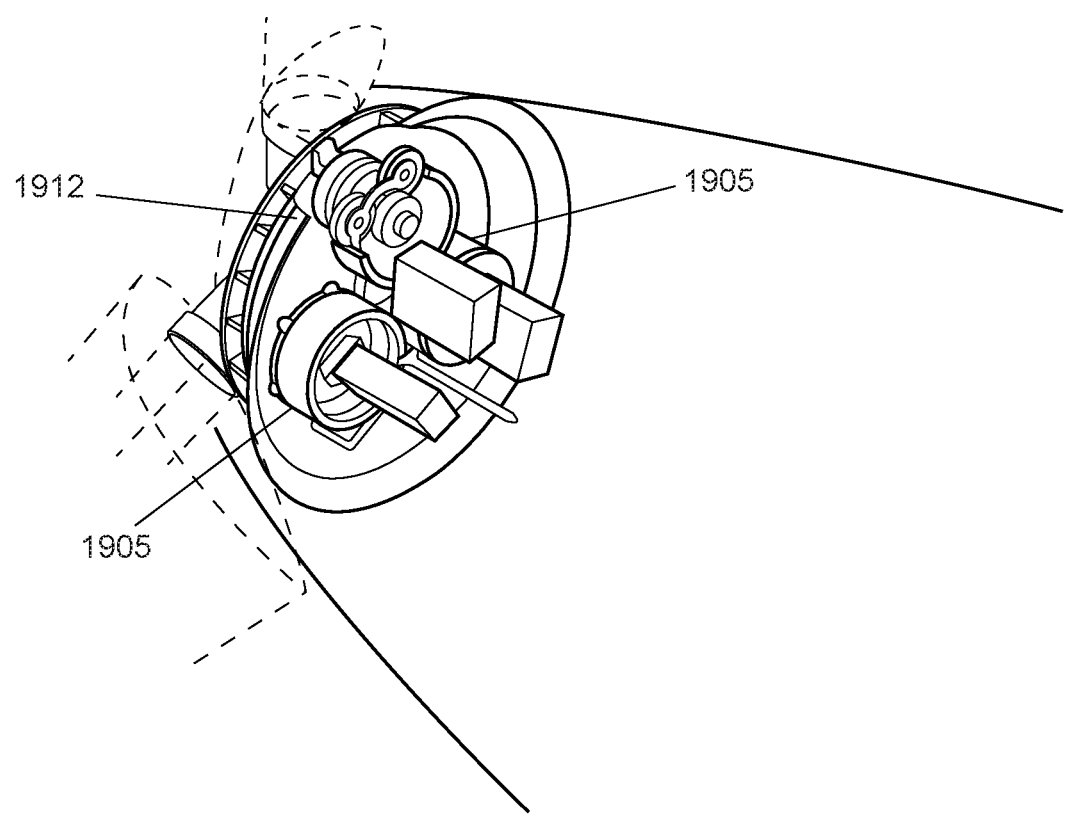
FIG. 23 shows a possible gear reduction system, nacelle, and motor configuration that may be used. This was already described in Patent US20180334251A1 (Karem), but not in the context of the aircraft claimed herein.

A gear reduction system, nacelle, and motor configuration, such as that shown in FIG. 23, may be used. The drivetrain and nacelle configuration taught in U.S. Ser. No. 10/351,235B2 (Karem), incorporated herein by reference, may be used. In FIG. 23, motors 1905 drive ring gear 1912. Such a system provides the nicety of further redundancy at the motor level. In the configuration shown in FIG. 23, each variable pitch rotor is driven by three motors 1905, however, other numbers of motors are contemplated. For example, two motors or four motors per rotor. However, other drivetrain configurations may be used with the current embodiment.

Figure 24:
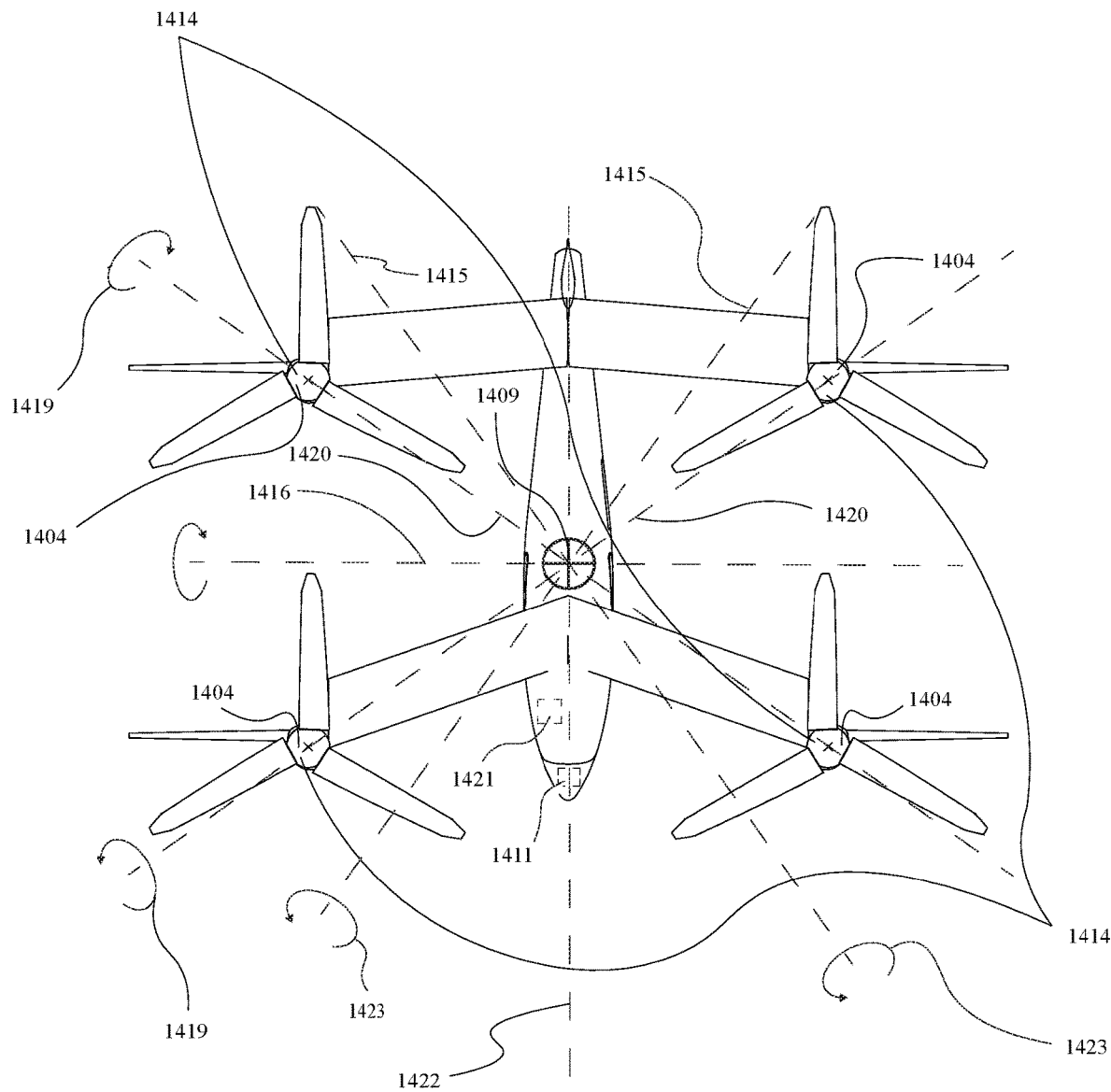
FIG. 24 shows a top view of an embodiment of an aircraft configured with four variable pitch rotors.

As illustrated in FIG. 24, a horizontal plane is defined by the roll axis 1422 and pitch axes 1416 of the aircraft. A variable pitch rotor pair x-axis 1420 runs between the centers of the variable pitch rotors that comprise the respective variable pitch rotor pair 1414 and through an envelope encompassing the center of gravity 1409. A first variable pitch rotor pair coordinate frame has an x-axis 1420 that intersects the centers of the variable pitch rotors that comprise the first variable pitch rotor pair. The first variable pitch rotor pair coordinate system further comprises a corresponding variable pitch rotor pair y-axis 1415 which runs perpendicular to the x-axis and parallel to the horizontal plane. The first variable pitch rotor coordinate system additionally comprises a first variable pitch rotor pair z-axis, which is perpendicular to both the variable pitch rotor x and y axes and may correspond to altitude. The first variable pitch rotor coordinate system additionally comprises a first moment axis 1419 about the variable pitch rotor pair x-axis and a second moment axis 1423 about the variable pitch rotor pair y-axis 1415. The second variable pitch rotor pair coordinate frame has an x-axis 1420 that intersects the centers of the variable pitch rotors that comprise the second variable pitch rotor pair 1414. The second variable pitch rotor pair coordinate system further comprises a corresponding variable pitch rotor pair y-axis 1415 which runs perpendicular to the x-axis 1420 and parallel to the horizontal plane. The second variable pitch rotor coordinate system additionally comprises a first variable pitch rotor pair z-axis, which is perpendicular to both the variable pitch rotor x and y axes and may correspond to altitude. The second variable pitch rotor coordinate system additionally comprises a first moment axis 1419 about the variable pitch rotor pair x-axis and a second moment axis 1423 about the variable pitch rotor pair y-axis 1415.

A first variable pitch rotor pair 1414 is capable of generating net thrust in the z-axis direction and moment about the respective variable pitch rotor pair y-axis 1415. Vertical thrust from a respective variable pitch rotor pair 1414 is the sum of the thrust from each variable pitch rotor 1404 in the respective variable pitch rotor pair 1414. Moment about each variable pitch rotor pair's y-axis results from thrust differences between the two rotors comprising the respective variable pitch rotor pair 1414 multiplied by the distance between centers of the respective variable pitch rotors.

An especially preferred embodiment comprises an electronic flight control system 1411 configured to respond to a failure without requiring discrete mode switching based on diagnosis of the failure. Such an embodiment eliminates the dangers of a false diagnosis of aircraft state. One embodiment achieves this goal by partitioning electronic flight control system 1411 functions such that subsystems in the electronic flight control system handle failure conditions by architectural design rather than real-time decision.

Figure 25:
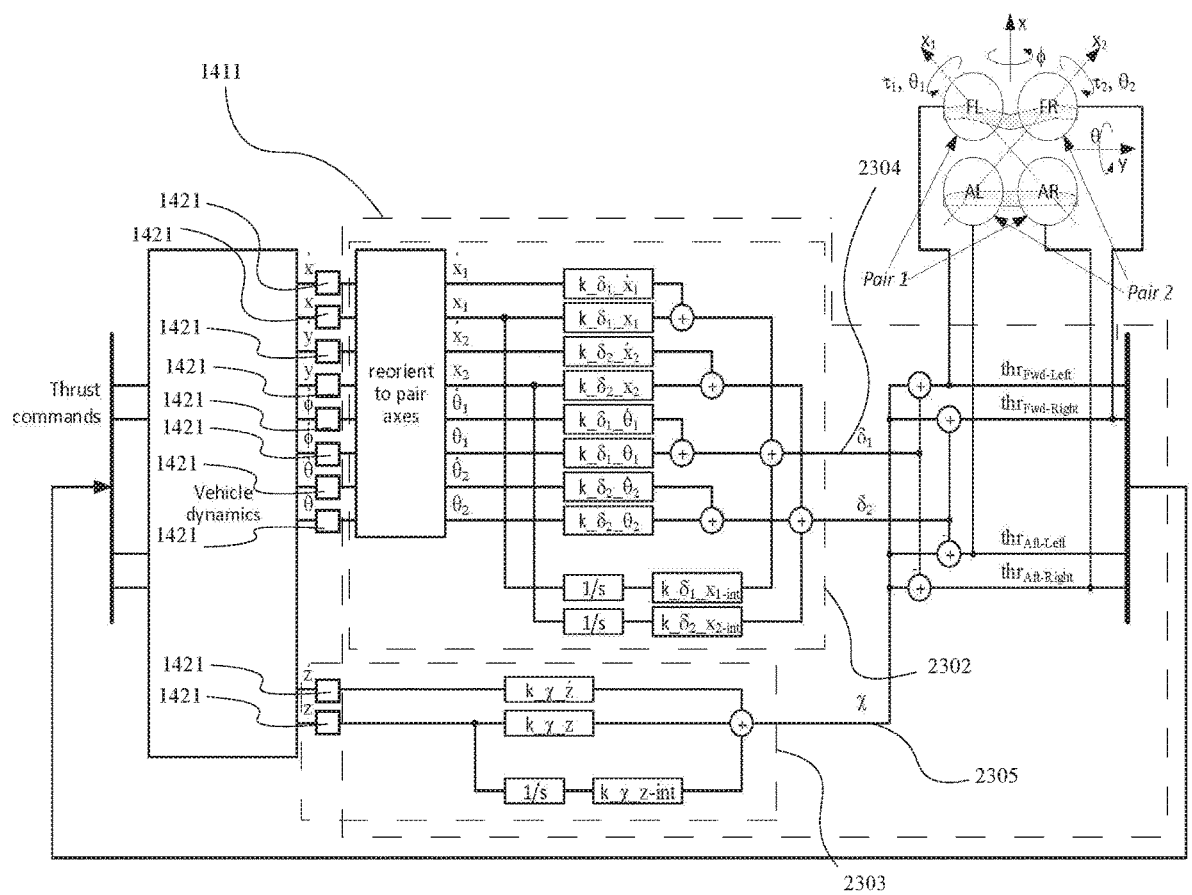
FIG. 25 illustrates a possible implementation of an electronic flight control system and associated systems.
Figure 26:
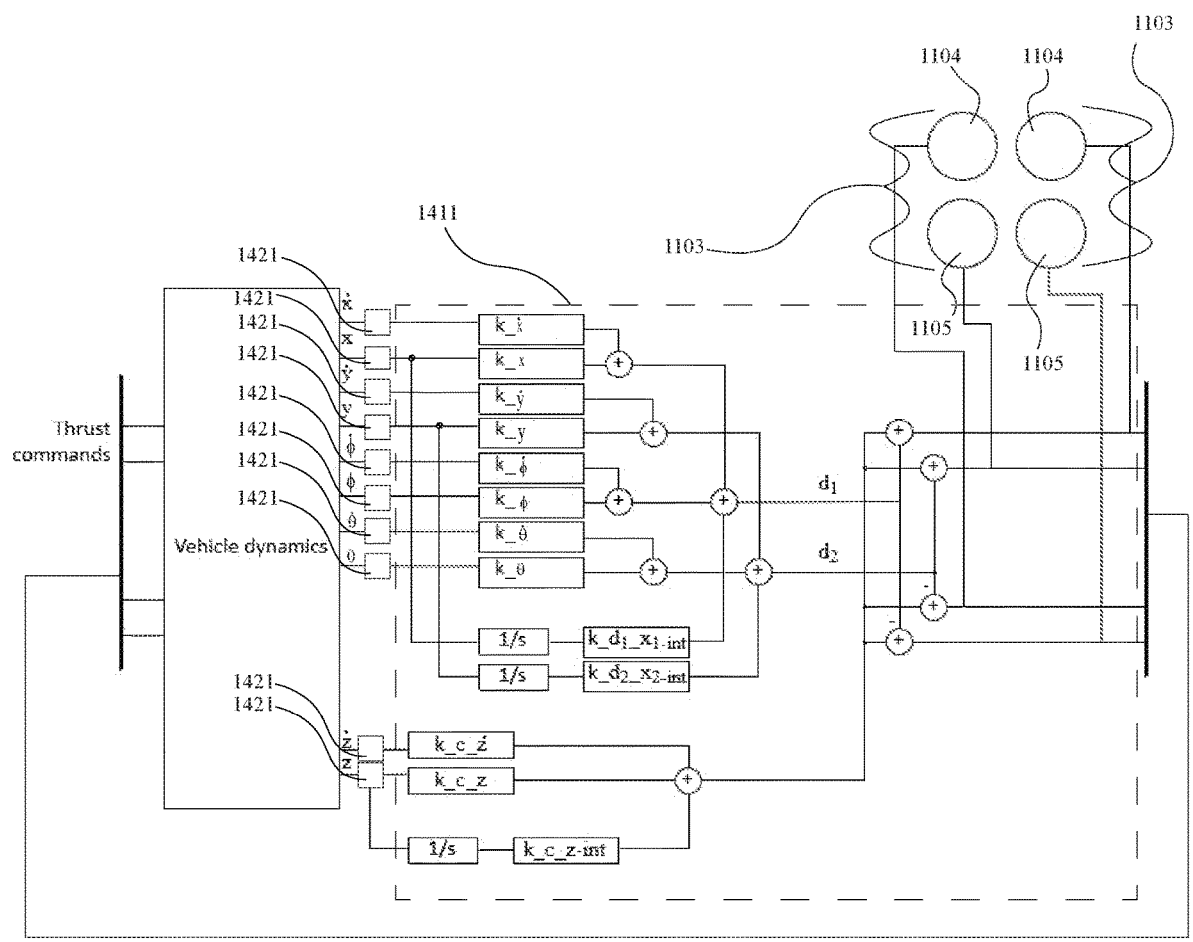
FIG. 26 illustrates another possible implementation of an electronic flight control system and associated systems.

In one embodiment, illustrated in FIG. 25 and FIG. 26, the electronic flight control system 1411 may, with the vehicle in VTOL mode, group a first and a second variable pitch rotor 1404 into a first variable pitch rotor pair 1414. Electronic flight control system 1411 may group the third and fourth variable pitch rotors 1404 into a second variable pitch rotor pair 1414. In one preferred embodiment the two variable pitch rotors that compose each variable pitch rotor pair are approximately opposite the center of gravity 1409 from each other. It should be understood that the two variable pitch rotors comprising a variable pitch rotor pair could be opposite—across an envelope encompassing the center of gravity 1409—from each other. Likewise, the third variable pitch rotor and the fourth variable pitch rotors 1404 are across an envelope containing the center of gravity from each other.

As illustrated in FIG. 25, electronic flight control system 1411 may comprise two command channels for each variable pitch rotor pair 1414: a variable pitch rotor pair thrust signal 2305 that commands the net thrust of the pair; and, a variable pitch rotor pair moment signal 2304 that commands the moment for the first variable pitch rotor pair. The signal value for each of these channels are computed by separate control laws. A variable pitch rotor pair thrust control law 2303 regulates vehicle altitude and generates a command to the variable pitch rotor pair thrust signal; an attitude control law 2302 regulates attitude and generates a command for the variable pitch rotor pair moment signal 2304.

The electronic flight control system 1411 may receive a vehicle dynamics value from a vehicle dynamics sensor 1421. Vehicles dynamics sensor 1421 may comprise one or more of a GPS, a magneto meter, an IMU, or other known sensor. Electronic flight control system may compute a vehicle dynamics error value using the value from the vehicle dynamics sensor 1421. Vehicle dynamics error value is translated into parameters corresponding to the first and second variable pitch rotor pair coordinate frame. Electronic flight control system 1411 may proportionately multiply the vehicle dynamics error value for a given parameter. A system attitude input is generated. The system attitude input is added or subtracted from a corresponding system altitude input. A combined input is then sent to a vehicle dynamics control device. In FIG. 25, the signals are illustrated being as sent to vehicle dynamics control devices associated with each rotor, such as rotor blade pitch actuators and motors, however it should be understood that the signals may be sent to other vehicle dynamics control devices. A vehicle dynamics control device may include the electric motor coupled to one of the variable pitch rotors, an actuator configured to control variable pitch rotor blade pitch, a control surface actuator, a rotor tilt actuator, or any other device configured to control vehicle dynamics.

In such a preferred embodiment—such as the embodiment illustrated in FIG. 24—failure of a single variable pitch rotor 1404 in a variable pitch rotor pair 1414 impairs the ability of the respective variable pitch rotor pair to generate net thrust and moment independently, but as long as the other variable pitch rotor in the variable pitch rotor pair 1414 is functioning, the variable pitch rotor pair retains its ability to generate a combination of thrust and moment. In a one rotor inoperable failure case, the variable pitch rotor pair—that the failure occurs in—continues to regulate vehicle attitude but is unable to contribute to regulation of vehicle altitude. The other variable pitch rotor pair 1414, consisting of two variable pitch rotors functioning normally, then assumes responsibility for regulating altitude.

Electronic flight control system 1411 may comprise a coefficient of thrust versus collective look up table. Electronic flight control system may determine a preferred RPM and collective pitch setting for sensed flight condition using said lookup table. Configuring an electronic flight control system 1411 using a lookup table allows for ideal RPM and collective pitch to be used for a given flight condition without additional measurement inputs, thus allowing the aircraft to exhibit ideal flight characteristics such as low noise and high efficiency.

The control system maintains vehicle altitude and attitude. One nicety of such embodiment is that the electronic flight control system may be configured to provide for continued smooth control when the aircraft experiences component failures.

In the instance of a one rotor inoperable condition, electronic flight control system 1411 may decrease or cut power to one of the operable variable pitch rotors. Electronic flight control system 1411 may also vary the mast moment of the operable variable pitch rotors to provide a confluence of forces such that the aircraft is capable of vertical takeoff and landing with less than all variable pitch rotors 1404 operable. The electronic flight control system 1411 may also alternatively both decrease power to at least one variable pitch rotor and vary the pitch moment of the operable variable pitch rotors 1404 to provide a desired confluence of forces.

Likewise, the aircraft of one embodiment contemplated herein may be configured to achieve VTOL flight with two of the variable pitch rotors inoperable, if the inoperable variable pitch rotors are on opposite corners. For example, if forward left variable pitch rotor 1404 and aft right variable pitch rotor 1404, in FIG. 22, both became inoperable, VTOL flight could be achieved using only forward right variable pitch rotor 1404 and aft left variable pitch rotor 1404.

It should be noted that any language directed to an electronic flight control system, or control and driver modules should be read to include any suitable combination of computing devices, including servers, interfaces, systems, databases, agents, peers, engines, controllers, or other types of computing devices operating individually or collectively. The computing devices may comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed above with respect to the disclosed apparatus. In some embodiments, various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Aspects of the electronic flight control system may be located somewhere on the aircraft on which the actuator is located or anywhere else including in a ground-based control center, on other aircraft, or even in components of the actuator itself.

Aspects of the electronic flight control system may be located somewhere on the aircraft on or anywhere else including in a ground-based control center, on other aircraft. Furthermore, in some embodiments electronic flight control system, and the control and driver modules may be implemented in distinguishable units or may be combined in one unit.

It should be recognized that concepts taught herein can equally apply to propellers, rotors or prop-rotors whether used in a helicopter, airplane, or tiltrotor aircraft. The term rotor should be understood to encompass rotor, propeller, and proprotor or any other rotating wing configured to generate thrust and/or lift. Additionally, rotor blade should be understood to encompass rotor blade, propeller blade, and proprotor blade or any a blade belonging to any other rotating wing configured to generate thrust and/or lift. For example, embodiments could be used to implement independent blade control on a turboprop. Such an implementation could reduce noise and vibrations in various flight conditions.

While embodiments have been discussed herein, they should be understood as illustrative and not limiting in any way. Furthermore, it should be understood that it is contemplated aspects of different embodiments may be mixed with aspects of other embodiments.

What is claimed is:

1. An aircraft capable of carrying at least 400 pounds of payload, comprising:
   a main body;
   first and second coaxial rotor stacks, each having a first variable pitch rotor system and a second variable pitch rotor system rotatable about a substantially common axis of rotation with each of the rotor systems being independently driven by at least a first torque-producing source;
   an electronic control system configured to control the rotational speed and the blade pitch of at least the first variable pitch rotor system in each of the first and second coaxial rotor stacks;
   a wing mechanically coupled to the main body, wherein the wing has each of a left outboard wing and a right outboard wing configured to independently pivot about a substantially spanwise axis, relative to the main body; and
   wherein each of the first and second variable pitch rotor systems in each of the coaxial rotor stacks provide sufficient thrust such that the aircraft is capable of controlled vertical takeoff and landing, even if up to one of the variable pitch rotor systems of each of the coaxial rotor stacks is inoperable.

2. The aircraft of claim 1, further comprising a tilt mechanism configured to tilt the first coaxial rotor stack by at least 80 degrees.

3. The aircraft of claim 1, wherein the first and second variable pitch rotor systems in the first coaxial rotor stack are configured to rotate in the same direction.

4. The aircraft of claim 1, wherein the first and second variable pitch rotor systems in the first coaxial rotor stack are configured to rotate in opposite directions.

5. The aircraft of claim 1, wherein the first variable pitch rotor system in the first coaxial rotor stack is configured to provide rotor cyclic control.

6. The aircraft of claim 5, wherein the first variable pitch rotor system in the first coaxial rotor stack comprises rigid blades and hubs configured to apply a mast moment to the aircraft.

7. The aircraft of claim 5, wherein the first variable pitch rotor system in the first coaxial rotor stack comprises rotor blades with individual blade control.

8. The aircraft of claim 1, wherein the first torque-producing source is a fuel-consuming engine.

9. The aircraft of claim 1, wherein the first torque-producing source is a first electric motor.

10. The aircraft of claim 9, further comprising a gear reduction system operationally coupling the first variable pitch rotor system and the first electric motor.

11. The aircraft of claim 10, wherein the first variable pitch rotor system in the first coaxial rotor stack is driven by each of the first electric motor and at least a second electric motor through the gear reduction system.

12. The aircraft of claim 1, further comprising a first mechanical clutch system configured such that at least the first torque-producing source configured to drive the first variable pitch rotor system in the first coaxial rotor stack is configured to drive the second variable pitch rotor system in the first coaxial rotor stack when the first mechanical clutch system is disengaged.

13. The aircraft of claim 1, wherein the first and second variable pitch rotor systems in each of the first and second coaxial rotor stacks, together with each of the torque-producing sources, and together with the electronic control system are sufficiently sized and configured to enable controlled vertical takeoff and landing without the aid of any additional lift-producing sources, even if up to one of the variable pitch rotor systems of each of the coaxial rotor stacks is inoperable.

14. The aircraft of claim 1, wherein the first variable pitch rotor system is configured to operate at an RPM level less than 80% of a maximum rotor system RPM level.

15. The aircraft of claim 14, wherein either the first or second variable pitch rotor is configured to operate at an RPM level less than 60% of a maximum rotor system RPM level.

\* \* \* \* \*